United States Patent
Kim et al.

(10) Patent No.: US 11,283,663 B2
(45) Date of Patent: *Mar. 22, 2022

(54) METHOD AND DEVICE FOR TRANSMITTING/RECEIVING SYNCHRONIZATION SIGNAL IN WIRELESS CELLULAR COMMUNICATION SYSTEM

(71) Applicant: Samsung Electronics Co., Ltd., Suwon-si (KR)

(72) Inventors: Younsun Kim, Seongnam-si (KR); Donghan Kim, Osan-si (KR); Seunghoon Choi, Seongnam-si (KR); Yongjun Kwak, Yongin-si (KR); Youngbum Kim, Seoul (KR); Youngwoo Kwak, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

This patent is subject to a terminal disclaimer.

(21) Appl. No.: 16/828,334

(22) Filed: Mar. 24, 2020

(65) Prior Publication Data

US 2020/0228383 A1 Jul. 16, 2020

Related U.S. Application Data

(63) Continuation of application No. 16/300,406, filed as application No. PCT/KR2017/004763 on May 8, 2017, now Pat. No. 10,715,373.

(30) Foreign Application Priority Data

May 9, 2016 (KR) .................. 10-2016-0056408
Aug. 5, 2016 (KR) .................. 10-2016-0100048

(51) Int. Cl.
  *H04L 27/26* (2006.01)
  *H04J 11/00* (2006.01)

(52) U.S. Cl.
  CPC ...... *H04L 27/2666* (2013.01); *H04L 27/2613* (2013.01); *H04J 2011/0096* (2013.01)

(58) Field of Classification Search
  None
  See application file for complete search history.

(56) References Cited

U.S. PATENT DOCUMENTS

2008/0205351 A1   8/2008  Lindoff et al.
2011/0223951 A1   9/2011  Miyoshi et al.
(Continued)

FOREIGN PATENT DOCUMENTS

CN    101636992 A    1/2010
JP    2011-176862 A  9/2011
(Continued)

OTHER PUBLICATIONS

Ericsson, Synchronization signals for 7.5 kHz subcarrier spacing, TSG-RAN WG1 #48bis, R1-071582, Malta, Apr. 3, 2007.
(Continued)

*Primary Examiner* — Saumit Shah
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention is a method by which a base (Continued)

station transmits a signal in a wireless communication system for efficiently performing an initial access procedure of a terminal, the method comprising the steps of: generating the synchronization signal on a basis of subcarrier spacing used in the synchronization signal; and transmitting the synchronization signal to the terminal.

20 Claims, 25 Drawing Sheets

(56) References Cited

U.S. PATENT DOCUMENTS

| | | |
|---|---|---|
| 2012/0002631 A1 | 1/2012 | Nishio et al. |
| 2012/0155443 A1 | 6/2012 | Cordeiro |
| 2013/0128822 A1 | 5/2013 | Mittelsteadt et al. |
| 2015/0043396 A1 | 2/2015 | Ekpenyong |
| 2015/0256308 A1 | 9/2015 | Ma et al. |
| 2015/0289219 A1 | 10/2015 | Kim et al. |
| 2016/0248553 A1 | 8/2016 | Shimezawa et al. |
| 2017/0290008 A1 | 10/2017 | Tooher et al. |
| 2018/0376439 A1 | 12/2018 | Urabayashi |

FOREIGN PATENT DOCUMENTS

| | | |
|---|---|---|
| KR | 10-2009-0113893 A | 11/2009 |
| KR | 10-2010-0003770 A | 1/2010 |
| WO | 2016-040290 A1 | 3/2016 |

OTHER PUBLICATIONS

European Search Report dated Mar. 20, 2019, issued in the European application No. 17796342.8.
Sharp, "Synchronization signal design for NB-IoT", 3GPP TSG RAN WG1 Meeting #83, R1-157119, Nov. 6, 2015.
Chinese Office Action dated Jan. 21, 2020, issued in Chinese Patent Application No. 201780029033.0.

EXAMPLE OF DETECTION OF SYNCHRONIZATION SIGNAL HAVING 15 KHZ SUBCARRIER SPACING (700)

EXAMPLE OF DETECTION OF SYNCHRONIZATION SIGNAL HAVING 60 KHZ SUBCARRIER SPACING (710)

METHOD AND DEVICE FOR TRANSMITTING/RECEIVING SYNCHRONIZATION SIGNAL IN WIRELESS CELLULAR COMMUNICATION SYSTEM

CROSS-REFERENCE TO RELATED APPLICATION(S)

This application is a continuation application of prior application Ser. No. 16/300,406, filed on Nov. 9, 2018, which was the National Stage under 35 U.S.C. § 371 of an International application number PCT/KR2017/004763, filed on May 8, 2017, which is based on and claimed priority of a Korean patent application number 10-2016-0056408, filed on May 9, 2016, in the Korean Intellectual Property Office, and of a Korean patent application number 10-2016-0100048, filed on Aug. 5, 2016, in the Korean Intellectual Property Office, the disclosure of each of which is incorporated by reference herein in its entirety.

TECHNICAL FIELD

One embodiment of the present disclosure relates to a wireless communication system, and more particularly, to a method and a system for efficient transmission and reception by a terminal in case where a plurality of subcarrier spacings are supported in one system in order to efficiently provide various services required in a next-generation mobile communication system. Further, another embodiment of the present disclosure relates to a wireless communication system, and more particularly, to a method and a device in which different wireless communication systems coexist on one carrier frequency or plural carrier frequencies, and a terminal capable of transmitting/receiving data in at least one of the different communication systems transmits and receives the data with the respective communication systems.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, with the development of 5G communication system, researches for satisfying various requirements and services in the 5G communication system have been made.

DISCLOSURE OF INVENTION

Technical Problem

In 5th generation wireless cellular communication system (hereinafter, 5G communication system), it is required to provide various services having different transmission/reception techniques and transmission/reception parameters in one system in order to satisfy various user requirements and services, and it is important to design the system so that any service to be added is not restricted by the current system in consideration of forward compatibility. As an example of a method for supporting various services in a 5G communication system, according to the present disclosure, a system for supporting a plurality of subcarrier spacings in one system may be considered. In such a 5G communication system, a terminal is unable to know the subcarrier spacing used in the system during an initial access process, and this may cause a problem that the initial access cannot be efficiently performed. Accordingly, in the present disclosure, it is necessary to provide a device and a method in which a terminal intending to access the 5G communication system can efficiently detect the subcarrier spacing supported by the system and then perform the initial access process.

Further, another aspect of the present disclosure is to provide a method and a device in which, as a scheme for satisfying the maximum delay time in time division duplex (TDD), subframes are divided into a plurality of types in the TDD, and data transmission/reception is provided not to exceed the maximum delay time in consideration of a specific subframe type among the respective divided subframe types as a subframe that can be dynamically changed as uplink and downlink subframe. Further, still another aspect of the present disclosure is to provide a method and a device for resource allocation for 5G beyond future services using the dynamic uplink/downlink change subframes and subframes in FDD.

Solution to Problem

In accordance with an aspect of the present disclosure to solve the above-described problems, a method by a base station for transmitting a signal in a wireless communication system includes generating a synchronization signal based on a subcarrier spacing used for the synchronization signal; and transmitting the synchronization signal to a terminal. The subcarrier spacing may be detected based on a repeat pattern of a time domain appearing when the synchronization signal is detected by the terminal.

In accordance with another aspect of the present disclosure, a method by a terminal for receiving a signal in a wireless communication system includes receiving a synchronization signal generated based on a subcarrier spacing used for the synchronization signal; and determining the subcarrier spacing based on the synchronization signal.

In accordance with still another aspect of the present disclosure, a base station transmitting a signal in a wireless communication system includes a transceiver configured to transmit and receive signals with a terminal; and a controller configured to generate a synchronization signal based on a subcarrier spacing used for the synchronization signal, and control the transceiver to transmit the synchronization signal to the terminal.

In accordance with yet still another aspect of the present disclosure, a terminal receiving a signal in a wireless communication system includes a transceiver configured to transmit and receive signals with a base station; and a controller configured to control the transceiver to receive a synchronization signal generated based on a subcarrier spacing used for the synchronization signal, and determine the subcarrier spacing based on the synchronization signal.

Advantageous Effects of Invention

According to the aspects of the present disclosure as described above, in order to satisfy various user requirements and services, a structure and a method are provided, in which a terminal can efficiently detect a subcarrier spacing and can perform an initial access in a 5G communication system supporting a plurality of subcarrier spacings.

Further, according to the aspects of the present disclosure, as a scheme for satisfying the maximum delay time in TDD for 5G, a method and a device are provided, in which subframes are divided into a plurality of types in the TDD, and data transmission/reception is provided not to exceed the maximum delay time in consideration of a specific subframe type among the respective divided subframe types as a subframe that can be dynamically changed as uplink and downlink subframe. Further, a method and a device for resource allocation are provided for 5G beyond future services using the dynamic uplink/downlink change subframes and subframes in FDD. On the other hand, other various effects will be disclosed directly or suggestively in the detailed description according to the aspects of the present disclosure to be described later.

MODE FOR THE INVENTION

Figure 1:
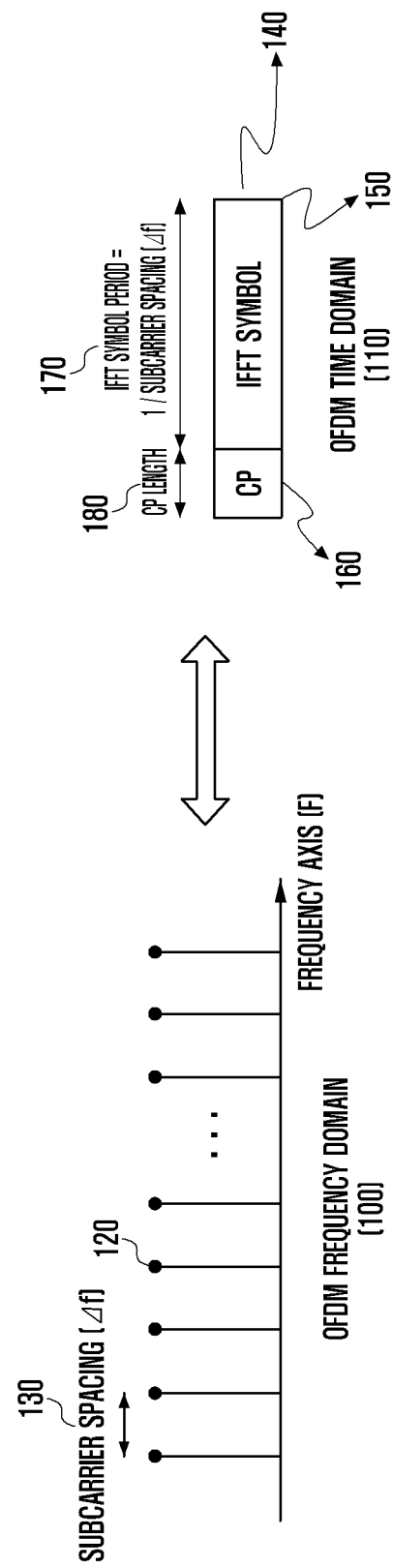
FIG. 1 is a diagram illustrating subcarrier spacing of an OFDM system used for modulation and demodulation of uplink and downlink signals in a 5G communication system considered in the present disclosure.

Hereinafter, embodiments of the present disclosure will be described in detail with reference to the accompanying drawings. In describing the present disclosure, related well-known functions or configurations incorporated herein are not described in detail in case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

First Embodiment

A wireless communication system was initially developed for the purpose of providing a voice-oriented service, but has been developed as a broadband wireless communication system that provides a high-speed and high-quality packet data service like communication standards, such as 3GPP high speed packet access (HSPA), long term evolution (LTE) or evolved universal terrestrial radio access (E-UTRA), LTE-advanced (LTE-A), LTE-A Pro, 3GPP2 high rate packet data (HRPD), ultra-mobile broadband (UMB), and IEEE 802.16e.

In the LTE system that is a representative example of the broadband wireless communication systems, downlink (DL) adopts an orthogonal frequency division multiplexing (OFDM) scheme, and uplink (UL) adopts single carrier frequency division multiple access (SC-FDMA) scheme. The uplink means a radio link in which a terminal (or user equipment (UE)) or a mobile station (MS) transmits data or a control signal to a base station (BS) (or eNode B (eNB)), and the downlink means a radio link in which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

As the post LTE communication system, the 5G communication system should support services that simultaneously satisfy various requirements of users and service providers since it is required to freely reflect the various requirements. Services being considered for the 5G communication system include enhanced mobile broadband (hereinafter, eMBB), massive machine type communication (hereinafter, mMTC), and ultra-reliability low-latency communication (hereinafter, URLLC).

The eMBB aims to provide a more improved data rate than the data rate supported by the existing LTE, LTE-A, or LTE-A Pro. For example, in the 5G communication system, the eMBB should provide, from the viewpoint of one base station, the maximum transmission rate of 20 Gbps in the downlink, and the maximum transmission rate of 10 Gbps in the uplink. Further, the 5G communication system should provide the maximum transmission rate and a user perceived data rate of an increased terminal. In order to satisfy such requirements, it is required to improve various transmission/reception technologies including more improved multi-input multi-output (MIMO) transmission technology. Further, the current LTE system transmits signals using the maximum 20 MHz transmission bandwidth in the 2 GHz band, whereas the 5G communication system uses a wider frequency bandwidth than 20 MHz in the frequency band of 3 to 6 GHz or 6 GHz or more, and thus can satisfy the data rate required in the 5G communication system.

At the same time, the mMTC is under consideration to support application services, such as the Internet of things (IoT), in the 5G communication system. In order to efficiently provide the Internet of things, the mMTC should satisfy requirements, such as massive terminal connection support in a cell, terminal coverage improvement, improved battery time, and terminal cost reduction. Since the Internet of things is attached to several sensors and various devices to provide communication functions, it should support a large number of terminals (e.g., 1,000,000 terminals/km$^2$) in the cell. Further, since there is a high possibility that the terminal supporting the mMTC is located in a shaded area that the cell is unable to cover, such as underground of a building, due to the service characteristics, a wider coverage is required as compared with other services provided in the 5G communication system. The terminal supporting the mMTC should be inexpensive, and requires very long battery life time, such as 10 to 15 years, since it is difficult to frequently replace a battery of the terminal.

Last, the URLLC is a cellular-based wireless communication service used for a specific purpose (mission-critical). For example, services may be used for remote control of a robot or machinery, industrial automation, unmanned aerial vehicle, remote health care, and emergency alert. Accordingly, the communication provided by the URLLC should provide very low latency and very high reliability. For example, a service supporting the URLLC should satisfy air interface latency that is shorter than 0.5 ms, and requires a packet error rate of 10$^{-5}$ or less at the same time. Accordingly, for the service supporting the URLLC, the 5G system should provide a transmit time interval (TTI) that is smaller than those of other services, and also requires a design to allocate wide resources in the frequency band in order to secure reliability of a communication link.

As described above, for the services that should be provided in the 5G communication system, different transmission/reception techniques and transmission/reception parameters may be used to satisfy different requirements of the respective services. As an example, it may be considered that the respective services have different subcarrier spacings in accordance with the requirements. Here, the subcarrier spacing means a spacing in which a plurality of subcarriers constituting the communication system based on orthogonal frequency division multiplexing (OFDM) or orthogonal frequency division multiple access (OFDMA) are put in the frequency domain.

FIG. 1 is a diagram illustrating subcarrier spacing of an OFDM system used for modulation and demodulation of uplink and downlink signals in a 5G communication system considered in the present disclosure.

Referring to FIG. 1, an OFDM system may be explained through division into a frequency domain 100 and a time domain 110. The OFDM system performs quadrature phase shift keying (QPSK) or quadrature amplitude modulation (QAM) of data to be transmitted, and then maps corresponding symbols to respective subcarriers 120 in the frequency domain 100. In the frequency domain 100, the OFDM system is composed of a plurality of subcarriers 120, and the plurality of subcarriers 120 are located to be spaced apart from each other for a subcarrier spacing (Δf) 130. As described above, in order to efficiently support various services and various carrier frequencies in the 5G communication system, it is considered that a plurality of subcarrier spacings 130 are supported in one system bandwidth.

At present, in order to support a plurality of subcarriers in the 5G communication system, two schemes have been considered. As the first method for supporting a plurality of subcarriers in the 5G communication system, a subcarrier spacing set that the 5G communication system can have may be determined using mathematical expression 1 below.

$$\Delta f = f_0 M \qquad \text{[Mathematical Expression 1]}$$

Here, $f_0$ denotes a basic subcarrier spacing of the system, and M denotes a scaling factor. For example, if $f_0$ is 15 kHz, the subcarrier spacing set that the 5G communication system can have may be composed of 7.5 KHz, 15 KHz, 30 KHz, 45 KHz, 60 KHz, and 75 KHz, and the system can be configured using the whole or a part of the corresponding set.

Further, as the second method for supporting a plurality of subcarriers in the 5G communication system, a subcarrier spacing set that the 5G communication system can have may be determined using mathematical expression 2 below.

$$\Delta f = f_0 2^m \qquad \text{[Mathematical Expression 2]}$$

Here, $f_0$ denotes a basic subcarrier spacing of the system, and m denotes an integer scaling factor. For example, if $f_0$ is 15 kHz, the subcarrier spacing set that the 5G communication system can have may be composed of 7.5 KHz, 15 KHz, 30 KHz, 60 KHz, and 120 KHz. In this case, the system can also be configured using the whole or a part of the corresponding set. In describing the present disclosure, it is assumed that the subcarrier spacing set of 15 KHz, 30 KHz, 60 KHz, and 120 KHz is used in a state where $f_0$ is 15 kHz in the 5G communication system in accordance with the two methods as described above. However, even with respect to another subcarrier spacing set (e.g., in case where $f_0$ is 17.5 kHz, and the subcarrier spacing set is composed of 17.5 KHz, 35 KHz, 70 KHz, and 140 KHz), the technology proposed in the present disclosure can be applied without limit, and this will be described later through an embodiment of the present disclosure. In case of considering the subcarrier spacing set composed of 17.5 KHz, 35 KHz, 70 KHz, and 140 KHz in the present disclosure, this may be mapped to the technology as described above based on the case where $f_0$ is 15 kHz. Similarly, 35 kHz, 70 kHz, and 140 kHz may be respectively mapped to 30 kHz, 60 kHz, and 120 kHz in a one-to-one manner in describing the present disclosure.

Various subcarrier spacing sets as described above may be used for various purposes in one system. As an example, in a band having a low carrier frequency, such as 2 to 4 GHz band, it may be suitable to use a low subcarrier spacing in consideration of the channel situation of the corresponding band (i.e., multi-path delay spread or coherence bandwidth). For example, since the path delay spread is relatively high and thus the coherence bandwidth is low in the carrier frequency of the 2 to 4 GHz band, it is profitable to use a low subcarrier spacing. At the same time, since higher influence caused by the channel situation and Doppler shift and frequency offset is exerted in a band having a carrier frequency that is higher than 6 GHz, it may be preferable to use a high subcarrier spacing. Further, for the system having requirements of very low transmission delay time, such as URLLC, even in case of a band using low carrier frequency, high subcarrier spacing may be used in the 5G communication system.

In FIG. 1, the OFDM system in the time domain 110 is configured in the unit of an OFDM symbol 140 that is the minimum unit of the OFDM time domain. The OFDM symbol 140 is configured by adding a cyclic prefix (hereinafter, CP) 160 to an IFFT symbol 150 that is obtained by performing inverse fast Fourier transform (IFFT) of a plurality of subcarriers inserted into the frequency domain 100. The CP 160 may be configured by copying a signal located in the last portion of the IFFT symbol to the front of the IFFT symbol 150. The IFFT symbol period 170 is in reverse proportion to the subcarrier spacing (Δf) 130. That is, if the subcarrier spacing 130 is widened, the IFFT symbol length 170 is relatively shortened, whereas if the subcarrier spacing 130 is narrowed, the IFFT symbol length 170 is lengthened in reverse proportion to the subcarrier spacing 130. For such a reason, in a system requiring very low transmission delay time, such as URLLC, a wide subcarrier spacing may be preferred to make the IFFT symbol length short. The CP length 180 is designed to minimize a power loss caused by the CP in a manner that it is normally set to be larger than the multi-path delay spread, but to be smaller than the IFFT symbol length 170.

Figure 2:
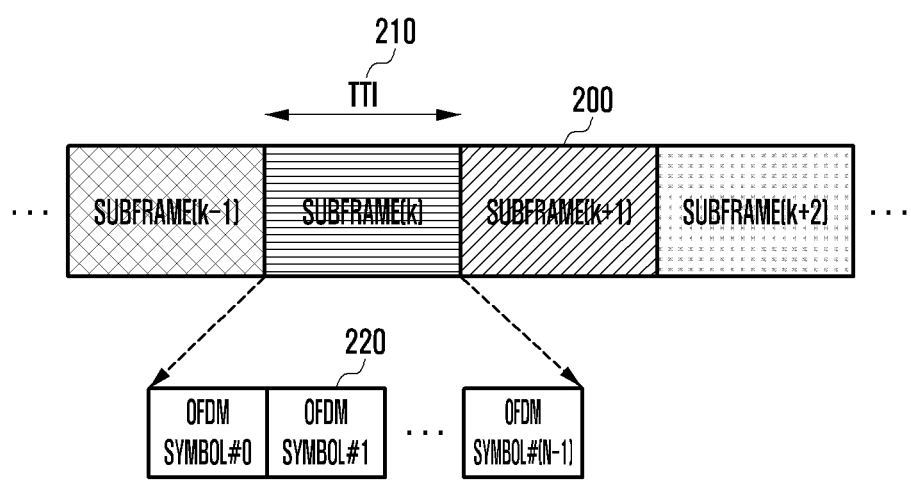
FIG. 2 is a diagram illustrating an example for supporting a single subcarrier spacing within one system as an example of a 5G communication system considered in the present disclosure.

As described above, in the 5G communication system, a plurality of subcarrier spacings can be supported in various methods in one system. FIG. 2 is a diagram illustrating an example of a 5G communication system considered in the present disclosure for supporting a single subcarrier spacing within one system.

Referring to FIG. 2, a signal transmitted by a base station or a terminal in the 5G communication system may be composed of a plurality of subframes 200. One subframe may be transmitted in one transmit time interval, and is composed of a plurality of OFDM symbols 220. Here, it is illustrated that one subframe 200 is composed of N OFDM symbols 220. Although it is assumed that one system uses only one subframe spacing in FIG. 2, a different subcarrier spacing may be used for each cell in accordance with cell operating scenarios. For example, in the 5G communication system using a low carrier frequency band (e.g., 2 to 4 GHz), a signal can be generated and transmitted using a low subcarrier spacing, such as 15 KHz. In contrast, in the 5G communication system using a high carrier frequency band (e.g., 28 or 60 GHz), it is preferable to use a high subcarrier spacing, such as 60 KHz in consideration of frequency error offset and phase noise. However, in case of considering flexibility, it is not preferable that the use of a specific subcarrier spacing is limited to a specific frequency band, and thus it is not excluded to use a high subcarrier band with respect to a low frequency band.

In case of using a different subcarrier spacing for each cell or system although a single subcarrier is used in one 5G communication system as described above, it is required for the terminal to know in advance the subcarrier spacing used by the base station in order to receive a downlink signal. However, if a different subcarrier spacing of a synchronization signal, which is received by the terminal in an initial access process after power-on, is used for each cell or system, there is a problem that the base station cannot configure the subcarrier spacing to the terminal through explicit signaling, and thus the terminal itself should detect the subcarrier spacing.

Here, definition of the synchronization signal means a reference signal that the base station transmits for time and frequency synchronization and cell search when the terminal performs the initial access to the base station, and in LTE, signals, such as a primary synchronization signal (PSS) and a secondary synchronization signal (SSS), may be transmitted for synchronization. In the present disclosure, signals serving as the PSS and SSS may be considered for the time and frequency synchronization and the cell search in the initial access process, or an additional signal structure may be considered, regardless of the number or kind of the signals used for the synchronization signals.

Figure 3:
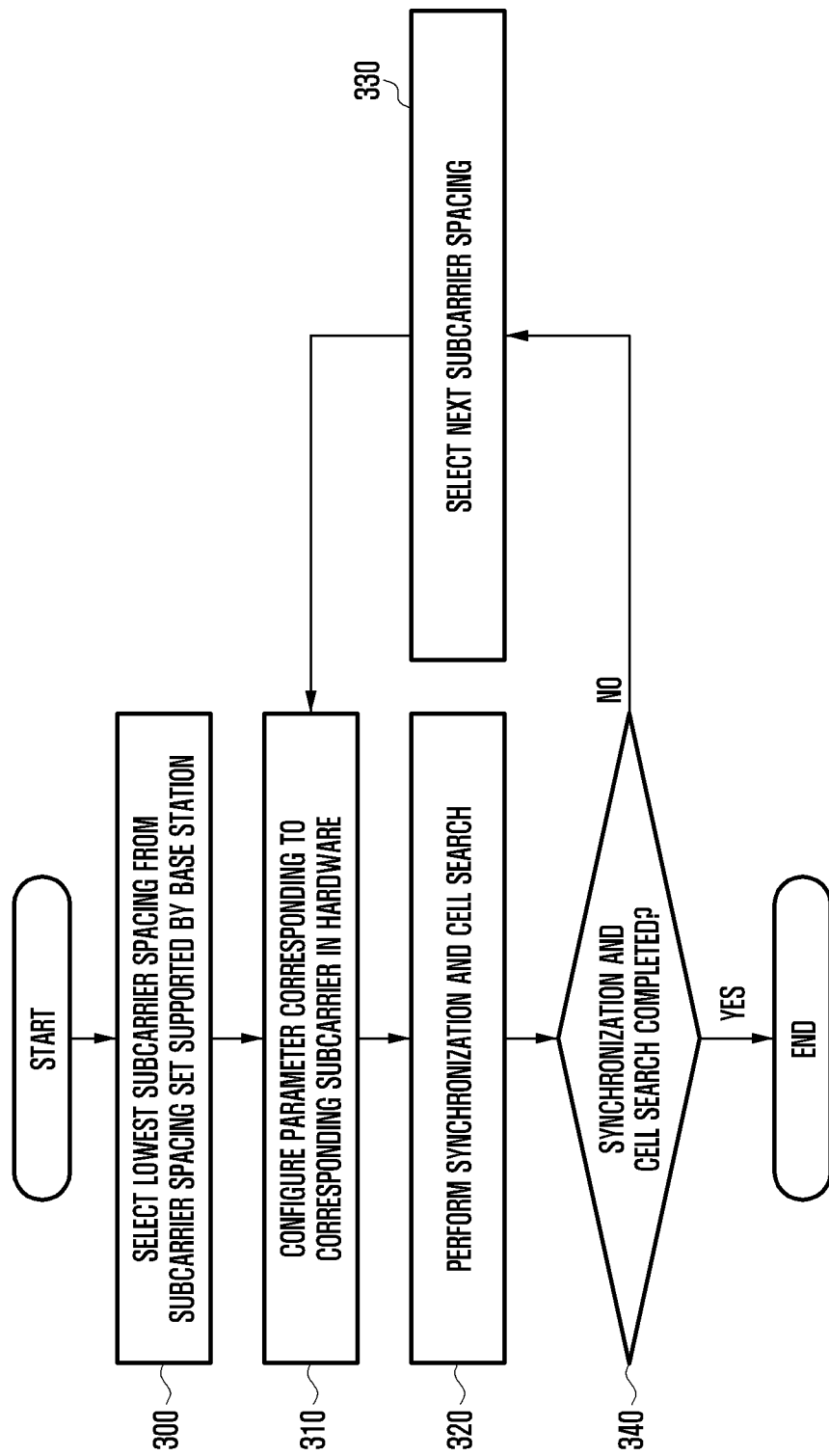
FIG. 3 is a diagram illustrating an example of a method in which a terminal discovers a subcarrier spacing in a process of performing an initial access of a 5G communication system through the terminal.

FIG. 3 is a diagram illustrating a first embodiment of a method in which a terminal discovers a subcarrier spacing in a process of performing an initial access in a 5G communication system if the terminal does not know the subcarrier spacing of a cell intended to be accessed.

Referring to FIG. 3, if the terminal does not know the subcarrier spacing used in the 5G communication system as described above, it may perform an initial access process with respect to all subcarrier spacings supported by the base station. That is, the terminal may perform the initial access after changing terminal hardware configuration (e.g., configuration of a radio frequency (RF) device, configuration of an analog-to-digital converter (ADC), and configuration of a baseband processor) with respect to one subcarrier spacing, and if the initial access has failed, the terminal may change the hardware configuration to a next usable subcarrier spacing, and may again perform the initial access. If the initial access is completed with a specific subcarrier spacing during performing the above-described process, the terminal may consider the corresponding subcarrier spacing as a subcarrier spacing used in the corresponding cell, and may use the reference timing and frequency offset detected using the corresponding subcarrier spacing, and the cell search value for the forward terminal operation.

In FIG. 3, operation 300 is an operation into which the terminal firstly enters for the initial access after the power-on, and includes an operation of selecting the lowest subcarrier spacing among the subcarrier spacing set supported by the base station. In this case, it is assumed that the terminal is aware of all subcarrier spacings supported by the base station. At operation 310, the terminal configures a parameter corresponding to the corresponding subcarrier to hardware. As described above, in accordance with the subcarrier spacing, the OFDM symbol length may differ, and the ADC sampling frequency may also differ. Accordingly, the terminal should properly change the configurations of the RF device, the ADC, and the baseband processor so as to perform the synchronization in accordance with the corresponding subcarrier spacing. At operation 320, the terminal performs time and frequency synchronization and cell search while receiving the signal in accordance with the hardware configuration at operation 310. The time and frequency synchronization and the cell search may be performed through detection of the synchronization signal transmitted by the base station. At operation 340, if the synchronization and the cell search is completed (i.e., if the synchronization signal is detected) within a preset specific time, the terminal considers that the base station has used the subcarrier spacing assumed for the synchronization and the cell search, and completes the operation on the assumption that the detection of the subcarrier spacing has been completed. In contrast, if the synchronization and the cell search is not completed within the preset specific time at operation 340, the terminal moves to operation 330 to select a subcarrier spacing having a next size among subcarrier spacings that can be supported by the base station, and then moves to operation 310 to continue the same process.

According to the embodiment explained through FIG. 3, the method by the terminal for detecting the subcarrier spacing requires to change the hardware configuration in the initial access process. Further, since an unnecessary process of detecting the synchronization signal with respect to various subcarrier spacings is required, terminal complexity is increased, and a lot of time is necessary to perform the initial access process. Accordingly, a method or a device by the base station for transmitting a signal, which may cause an efficient terminal operation, is necessary in consideration of the terminal implementation complexity and time required for the initial access.

Figure 4:
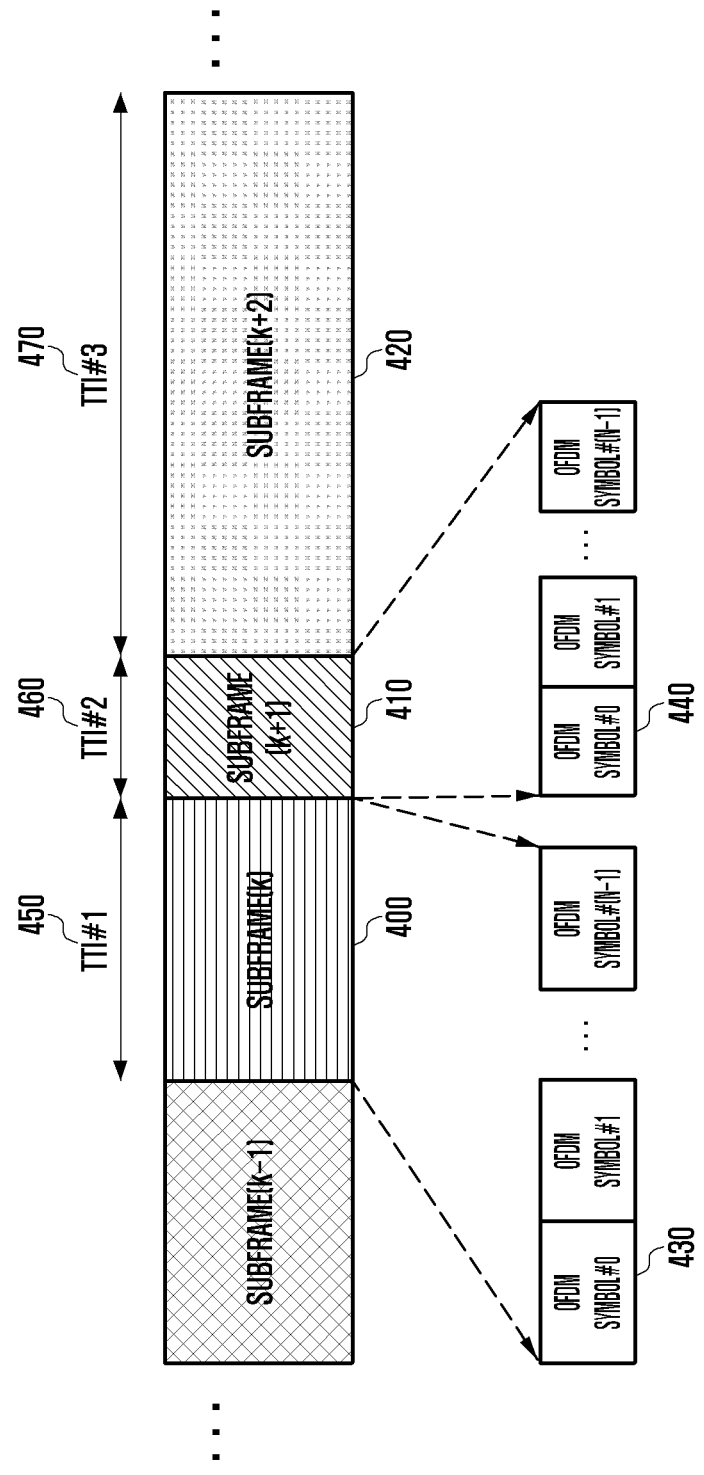
FIG. 4 is a diagram illustrating an example for supporting a plurality of subcarrier spacings within one system as an example of a 5G communication system considered in the present disclosure.

FIG. 4 is a diagram illustrating an example of a 5G communication system considered in the present disclosure for supporting a plurality of subcarrier spacings within one system.

Referring to FIG. 4, a signal transmitted by a base station or a terminal in the 5G communication system may be composed of a plurality of subframes 400, 410, and 420. In the system exemplified in FIG. 4, only one subcarrier spacing can be used in one subframe, but in another subframe, a signal in accordance with another subcarrier spacing can be transmitted. That is, signals having different subcarrier spacings may be multiplexed and transmitted in time domain. As an example, subframe 400 may use 15 kHz subcarrier spacing, and subframe 410 may use a subframe spacing corresponding to 30 kHz. If it is assumed that subframe 400 and subframe 410 use the same number of OFDM symbols 430 and 440, subframe 400 may have a transmit time interval corresponding to TTI #1 450, and subframe 410 may have a transmit time interval corresponding to TTI #2 460. Here, since the subcarrier spacing of subframe 400 is ½ of the subcarrier spacing of subframe 410, TTI #1 450 of subframe 400 has a length that is twice the length of TTI #2 460 of subframe 410. Similarly, it is exemplified that subframe 420 has a subcarrier spacing corresponding to 7.5 KHz, and thus may have TTI #3 470 that is relatively a long transmit time interval.

The 5G communication system according to FIG. 4 may be considered as a scheme for efficiently operating various services. For example, in order to provide an eMBB service, a signal may be transmitted using 15 kHz subcarrier spacing in consideration of the channel situation of a low frequency band. In contrast, for a service requiring very low transmission delay, such as URLLC, a high subcarrier spacing, such as 30 kHz, may be suitable. Further, in case of a terminal moving at high speed, a high subcarrier spacing may be necessary to reduce performance deterioration in accordance with Doppler shift, and a low subcarrier spacing may be useful in an mMTC or broadcasting system. In order to maintain the coverage while maintaining the number of terminals supportable in mMTC, a low subcarrier spacing is suitable. In the broadcasting service (MBMS), a relatively long CP length is required to obtain a single frequency network diversity, and in order to reduce an overhead having an increased CP length, a low subcarrier spacing may be suitable.

Even in case of supporting another subcarrier spacing for various services as described above, in the same manner as the example described using FIG. 2 as described above, there is a problem that the terminal should detect the subcarrier spacing used for the synchronization signal in an initial synchronization process. That is, since the terminal does not know not only the subcarrier spacing used by the base station to transmit various services but also the subcarrier spacing used for the synchronization signal, there is a problem that the terminal itself should detect the subcarrier spacing used for the synchronization signal in the initial access process. Even in the 5G communication system exemplified in FIG. 4, the subcarrier spacing can be detected through the method as illustrated in FIG. 3, but, as described above, it is inefficient to do so in consideration of the terminal complexity and time required for the initial access.

Further, although only a case where different subframes have different subcarrier spacings is exemplified in FIG. 4, even a case where different subcarrier spacings are provided in one subframe may be considered in order to efficiently provide services having various requirements. Even in this case, there is a problem that the terminal should detect the subcarrier spacing of the synchronization signal.

Figure 5:
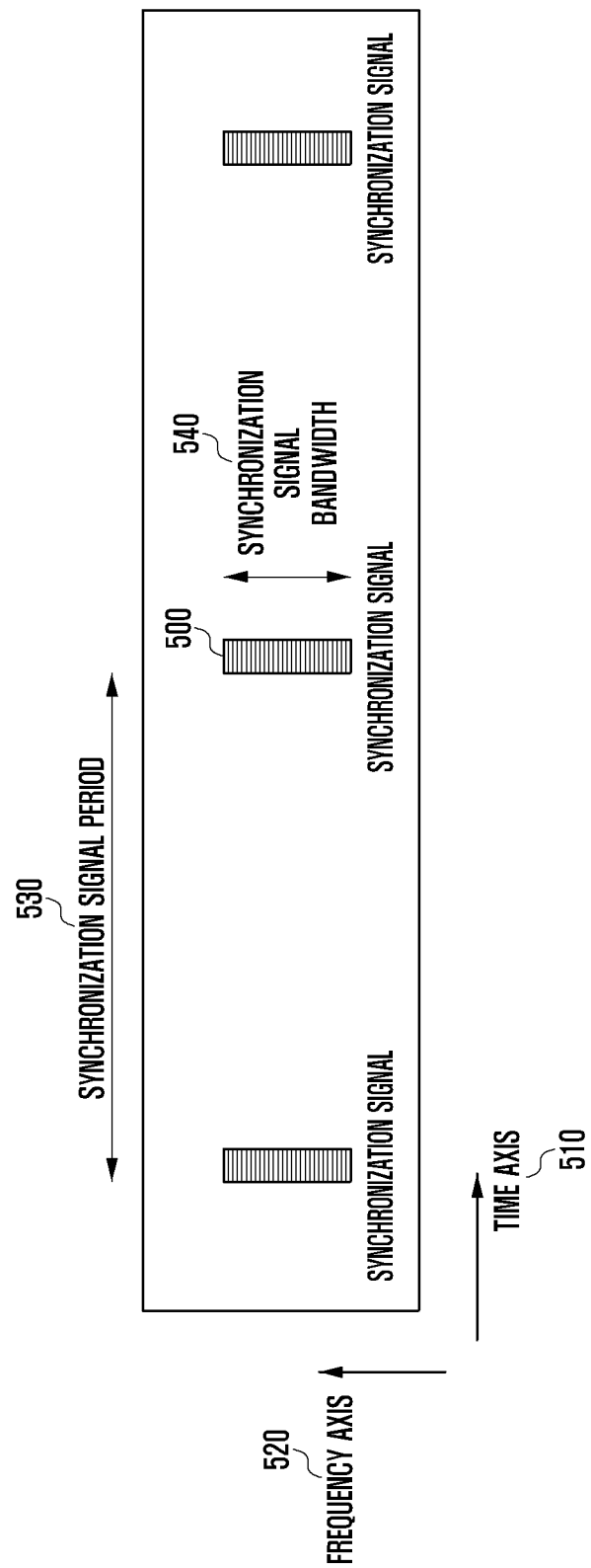
FIG. 5 is a diagram illustrating an embodiment in which a synchronization signal is transmitted in a 5G communication system considered in the present disclosure.

FIG. 5 is a diagram illustrating an embodiment in which a synchronization signal is transmitted in a 5G communication system considered in the present disclosure.

Referring to FIG. 5, a synchronization signal 500 may be transmitted in a predetermined period 530 on time axis 510. Further, the synchronization signal 500 may be transmitted within a predetermined synchronization signal transmission bandwidth 540 on frequency axis 520. The synchronization signal makes it possible to map a special sequence to a subcarrier in the transmission bandwidth 540 in order to indicate information required for the initial access of the terminal including a cell ID. In the synchronization signal, a combination of one or a plurality of sequences may be mapped to the information including the cell ID, and the terminal can detect the ID of the cell to which the terminal intends to access by detecting the sequence used for the synchronization signal. The sequence used for the synchronization signal may be a sequence having constant amplitude zero auto correlation (CAZAC) characteristics, such as Zadoff-Chu sequence or Golay sequence, or a pseudo random noise sequence, such as M-sequence or Gold sequence. In the present disclosure, it is assumed that the above-described PSS or SSS is used for the synchronization signal, but the present disclosure is not described to be limited to any specific signal.

The synchronization signal 500 may be configured using one OFDM symbol or a plurality of OFDM symbols. In case where the synchronization signal is configured using a plurality of OFDM symbols, sequences for a plurality of different synchronization signals may be mapped to the respective OFDM symbols. As an example, in a similar manner to LTE, the PSS may be generated using three Zadoff-Chu sequences, and the SSS may be generated using the Gold sequence.

The synchronization signal 500 may be transmitted using different subcarrier spacings in accordance with the frequency band used in the system or an environment in a similar manner to other services. For example, in a low frequency band, such as 2 or 4 GHz band, 15 or 30 kHz subcarrier spacing may be used for generation and transmission of the synchronization signal, whereas in a high frequency band, such as 6 GHz band, 60 kHz subcarrier spacing may be used for the generation and transmission of the synchronization signal. However, as described above, it is not limited to use a specific subcarrier spacing in a specific frequency band, and, if needed, the base station may configure various subcarrier spacings for the synchronization signal.

As described above, the terminal does not know the subcarrier spacing that the base station managing a specific cell uses to transmit the synchronization signal when the terminal performs the initial access with respect to the corresponding cell, and thus difficulty may occur in performing the synchronization and cell search. Further, even in case of performing not only the initial access but also an adjacent cell search for measuring a handover and an adjacent cell, the terminal does not know the subcarrier spacing that the synchronization signal of the adjacent cell uses, and thus difficulty may occur. In order to solve this, as described above, a method in which the terminal performs the initial access with respect to all subcarrier spacings that can be supported by the base station may be considered. However, this increases time required in the initial access process, and thus is not suitable in consideration of the initial access and the adjacent cell search.

According to a second embodiment of the present disclosure to be described later, a synchronization signal structure and a transmission method thereof are proposed, which enable the terminal to efficiently detect the subcarrier spacing of the synchronization signal in the initial access process. Further, according to the present disclosure, a method and a device for the terminal to receive the synchronization signal are proposed, which enable the terminal to efficiently detect the subcarrier spacing of the synchronization signal in the initial access process. In the present disclosure, a case where the subcarrier spacing supported in the 5G communication system is mainly 15 kHz, 30 KHz, 60 KHz, and 120 KHz in a state where the basic subcarrier spacing is 15 kHz will be described, but even in case where the basic subcarrier spacing has a different frequency (e.g., 17.5 kHz), the embodiment described in the present disclosure may be applied.

As the second embodiment of the present disclosure, a method and a structure of a synchronization signal for the initial access and adjacent cell search in the 5G communication system are proposed.

In the system supporting a plurality of subcarrier spacings, different synchronization signals should be defined in accordance with the plurality of subcarrier spacings, and the base station can transmit the synchronization signal through proper selection of the subcarrier spacing of the synchronization signal in accordance with an environment supported by each cell and service requirements. Accordingly, the synchronization signal having a different subcarrier spacing can be transmitted for each base station, and it is required for the terminal to detect the subcarrier spacing corresponding to the synchronization signal in the initial access and adjacent cell search process.

The present disclosure proposes a method for mapping sequences of the synchronization signal always in the same location regardless of the subcarrier spacing for transmitting the synchronization signal for the initial access and adjacent cell search in the 5G communication system that can support a plurality of subcarrier spacings. According to the embodiment, the actual sequences of the synchronization signal may be mapped at equal frequency spacings regardless of the subcarrier spacings used by the base station to transmit the synchronization signal.

Figure 6:
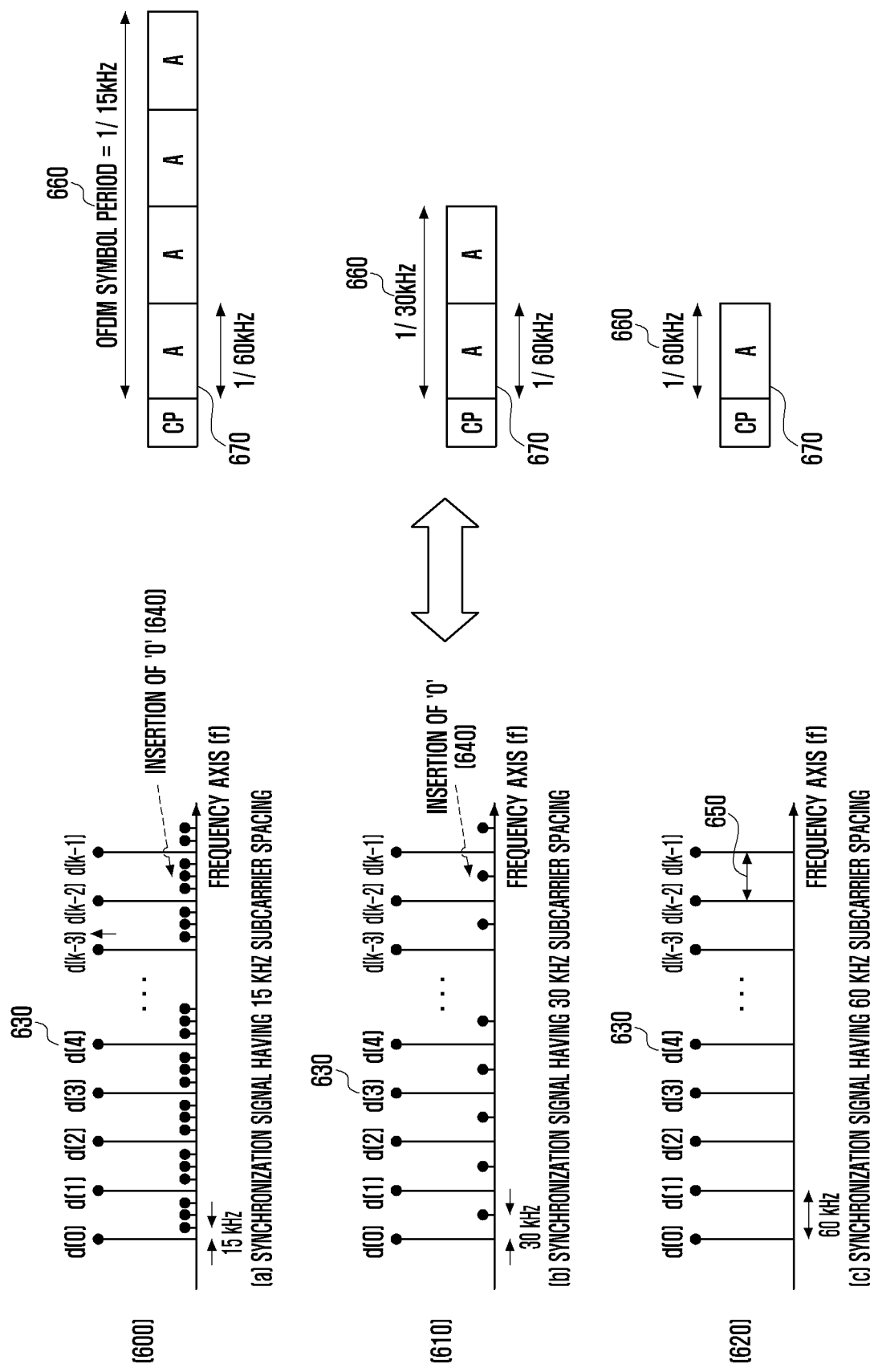
FIG. 6 is a diagram illustrating a method for constantly mapping sequences of a synchronization signal at equal frequency spacings regardless of subcarrier spacings used for the synchronization signal according to an embodiment of the present disclosure.

FIG. 6 is a diagram illustrating a method for constantly mapping sequences of a synchronization signal at equal frequency spacings regardless of subcarrier spacings used for the synchronization signal according to an embodiment of the present disclosure.

Referring to FIG. 6, a system 600 having 15 kHz subcarrier spacing, a system 610 having 30 KHz subcarrier spacing, and a system 620 having 60 KHz subcarrier spacing are considered. Here, it is assumed that the maximum supportable subcarrier spacing is 60 KHz in the 5G communication system supporting a plurality of subcarrier spacings. In this case, rules used to map the actual sequences of the synchronization signal at equal frequency spacings regardless of the subcarrier spacings used for the synchronization signal are as follows.

In the synchronization signal having 15 kHz subcarrier spacing, the sequence used for the synchronization signal may be mapped to every fourth subcarrier among subcarriers allocated for the synchronization signal, and a null (or "0") may be inserted into the remaining subcarriers. That is, it is possible to apply a comb-type structure in which the sequences used for the synchronization signal are mapped to every four subcarriers.

In the synchronization signal having 30 kHz subcarrier spacing, the sequence used for the synchronization signal may be mapped to every second subcarrier among subcarriers allocated for the synchronization signal, and a null (or "0") may be inserted into the remaining subcarriers. That is, it is possible to apply a comb-type structure in which the sequences used for the synchronization signal are mapped to every two subcarriers.

In the synchronization signal having 60 kHz subcarrier spacing, the sequences used for the synchronization signal are mapped to all subcarriers allocated for the synchronization signal. That is, a structure is applied, in which sequences used for the synchronization signal are mapped to all subcarriers without considering the comb type.

In case of a synchronization signal 600 having 15 kHz subcarrier spacing in an embodiment according to FIG. 6, the sequence d(k) 630 used for the synchronization signal is inserted into every fourth subcarrier, and a null is inserted into the remaining subcarriers 640. Similarly, in case of a synchronization signal 610 having 30 kHz subcarrier spacing, the sequence d(k) 630 used for the synchronization signal is inserted into every second subcarrier, and a null is inserted into the remaining subcarriers 640. In case of a synchronization signal 620 having 60 kHz subcarrier spacing, the sequence d(k) 630 used for the synchronization signal is mapped to all subcarriers without null insertion.

That is, the sequence d(k) 630 used for the synchronization signal is inserted into a subcarrier corresponding to integer times the ratio of the maximum subcarrier spacing considered for the synchronization signal to the subcarrier spacing used for the current synchronization signal, and a null is inserted into the remaining subcarriers 640. As described above, if the sequence used for the synchronization signal is mapped using the ratio of the maximum subcarrier spacing used for the synchronization signal to the subcarrier spacing of the synchronization signal to be currently transmitted, the synchronization sequence can be mapped to the subcarrier at constant frequency spacings 650 regardless of the subcarrier spacings. That is, the sequence used for the synchronization signal may be mapped at constant frequency spacings regardless of the subcarrier spacings used by the base station for the synchronization signal. The base station may select the subcarrier spacing intended to be used for transmission of the synchronization signal, and may transmit the synchronization signal in accordance with the embodiment as described above.

As described above, the method for mapping the synchronization signal to the subcarrier of the frequency domain has the advantage that a repeat pattern is provided in one OFDM symbol of the time domain. That is, as described above, if the sequence of the synchronization signal is mapped and an IFFT is performed with respect to the sequence, the time-domain signal has a repeat pattern as much as the ratio of the maximum subcarrier spacing to the subcarrier spacing of the synchronization signal currently used in the system in one OFDM symbol period. For example, since the synchronization signal sequence is mapped every four subcarriers in the synchronization signal having 15 kHz subcarrier spacing, a pattern occurs, in which four equal signals "A" 670 are repeated in a time corresponding to one OFDM symbol period 660, in a time-domain signal generated by performing the IFFT. The time-domain signal "A" 670 is a signal that is equal to the synchronization signal of 60 KHz subcarrier spacing using the same synchronization signal sequence in the time domain. Further, since the synchronization signal sequence is mapped every two subcarriers in the synchronization signal having 30 kHz subcarrier spacing, a pattern occurs, in which two equal signals "A" 670 are repeated in a time corresponding to one OFDM symbol period 660, in the time domain in which the IFFT is performed. The time-domain signal "A" 670 is a signal that is equal to the synchronization signal of 60 KHz subcarrier spacing using the same synchronization signal sequence in the time domain. Accordingly, in performing initial synchronization using the synchronization signal transmitted by the base station, the terminal may perform cross-correlation using the synchronization signal of 60 KHz subcarrier spacing regardless of what subcarrier spacing the base station transmits the synchronization signal with.

As described above, the repeat pattern in the time domain of the synchronization signal can provide many advantages in implementing a receiver of the terminal. First, in case of using the same synchronization signal sequence d(k), the same time-domain pattern "A" 670 occurs regardless of the subcarrier spacing, and thus from the viewpoint of the terminal, it is advantageous that the signal can be detected using the same signal detector regardless of the subcarrier spacing used for the synchronization signal. Further, it is advantageous that the terminal can detect the subcarrier spacing used for the synchronization signal using the repeat pattern in the time domain.

According to the method for mapping the sequence for the synchronization signal to the subcarrier according to an embodiment of the present disclosure, various combinations of various subcarrier spacing set may be possible. If 17.5 kHz, 35 kHz, and 70 kHz are considered as the subcarrier spacings for the synchronization signal in the 5G communication system considered in the present disclosure, the following mapping rules may be used.

In the synchronization signal having 17.5 kHz subcarrier spacing, the sequence used for the synchronization signal is mapped to every fourth subcarrier among subcarriers allocated for the synchronization signal, and a null (or "0") is inserted into the remaining subcarriers. That is, it is possible to apply a comb-type structure in which the sequences used for the synchronization signal are mapped to every four subcarriers.

In the synchronization signal having 35 kHz subcarrier spacing, the sequence used for the synchronization signal is mapped to every second subcarrier among subcarriers allocated for the synchronization signal, and a null (or "0") is inserted into the remaining subcarriers. That is, it is possible to apply a comb-type structure in which the sequences used for the synchronization signal are mapped to every two subcarriers.

In the synchronization signal having 70 kHz subcarrier spacing, the sequences used for the synchronization signal are mapped to all subcarriers allocated for the synchronization signal. That is, a structure is applied, in which sequences used for the synchronization signal are mapped to all subcarriers without considering the comb type.

Further, if 15 kHz, 30 kHz, 60 kHz, and 120 kHz are considered as the subcarrier spacings for the synchronization signal in the 5G communication system considered in the present disclosure, the following mapping rules may be used.

In the synchronization signal having 15 kHz subcarrier spacing, the sequence used for the synchronization signal is mapped to every eighth subcarrier among subcarriers allocated for the synchronization signal, and a null (or "0") is inserted into the remaining subcarriers. That is, it is possible to apply a comb-type structure in which the sequences used for the synchronization signal are mapped to every eight subcarriers.

In the synchronization signal having 30 kHz subcarrier spacing, the sequence used for the synchronization signal is mapped to every fourth subcarrier among subcarriers allocated for the synchronization signal, and a null (or "0") is inserted into the remaining subcarriers. That is, it is possible to apply a comb-type structure in which the sequences used for the synchronization signal are mapped to every four subcarriers.

In the synchronization signal having 60 kHz subcarrier spacing, the sequence used for the synchronization signal is mapped to every second subcarrier among subcarriers allocated for the synchronization signal, and a null (or "0") is inserted into the remaining subcarriers. That is, it is possible to apply a comb-type structure in which the sequences used for the synchronization signal are mapped to every two subcarriers.

In the synchronization signal having 120 kHz subcarrier spacing, the sequences used for the synchronization signal are mapped to all subcarriers allocated for the synchronization signal. That is, a structure is applied, in which sequences used for the synchronization signal are mapped to all subcarriers without considering the comb type.

Further, if 15 kHz, 30 kHz, 60 kHz, and 120 kHz are considered as the subcarrier spacings for the synchronization signal in the 5G communication system considered in the present disclosure, the following mapping rules may be used.

In the synchronization signal having 15 kHz subcarrier spacing, the sequence used for the synchronization signal is mapped to every second subcarrier among subcarriers allocated for the synchronization signal, and a null (or "0") is inserted into the remaining subcarriers. That is, it is possible to apply a comb-type structure in which the sequences used for the synchronization signal are mapped to every two subcarriers.

In the synchronization signal having 30 kHz subcarrier spacing, the sequences used for the synchronization signal are mapped to all subcarriers allocated for the synchronization signal. That is, a structure is applied, in which sequences used for the synchronization signal are mapped to all subcarriers without considering the comb type.

In the synchronization signal having 60 kHz subcarrier spacing, the sequence used for the synchronization signal is mapped to every second subcarrier among subcarriers allocated for the synchronization signal, and a null (or "0") is inserted into the remaining subcarriers. That is, it is possible to apply a comb-type structure in which the sequences used for the synchronization signal are mapped to every two subcarriers.

In the synchronization signal having 120 kHz subcarrier spacing, the sequences used for the synchronization signal are mapped to all subcarriers allocated for the synchronization signal. That is, a structure is applied, in which sequences used for the synchronization signal are mapped to all subcarriers without considering the comb type.

In the above-described case, the terminal can detect the synchronization signals having 15 kHz subcarrier spacing and 30 kHz subcarrier spacing through the same detector, and can detect the synchronization signals having 60 kHz subcarrier spacing and 120 kHz subcarrier spacing through another detector. Accordingly, the terminal performs an initial access with respect to the synchronization signal having 15 or 30 kHz subcarrier spacing, and if the initial access has not succeeded, the terminal additionally performs the initial access with respect to the synchronization signal having 60 kHz and 120 kHz subcarrier spacings to detect the subcarrier spacing that the base station supports for the synchronization signal.

Figure 7:
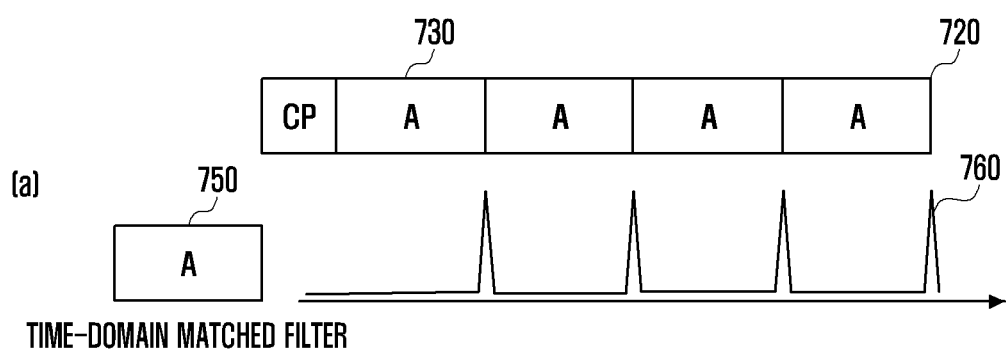
FIG. 7 is a diagram illustrating a method in which a terminal receiver detects subcarrier spacings of a synchronization signal in case of differently mapping synchronization sequences in accordance with the subcarrier spacings used for the synchronization signal according to an embodiment of the present disclosure.
Figure 7:
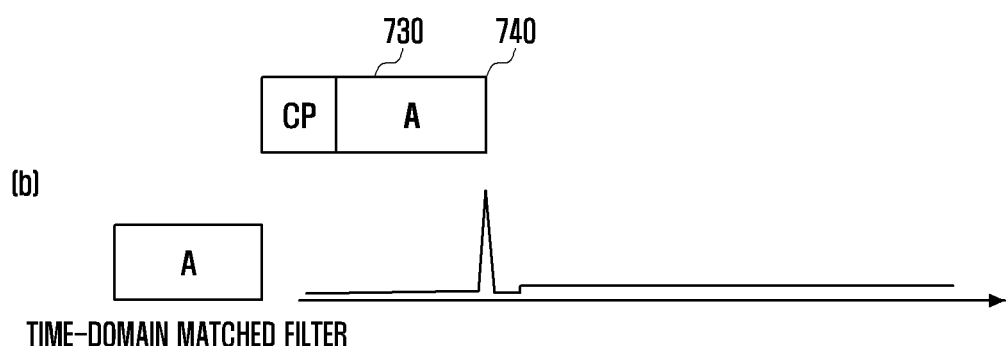

FIG. 7 is a diagram illustrating a method in which a terminal receiver detects subcarrier spacings of a synchronization signal in case of differently mapping synchronization sequences in accordance with the subcarrier spacings used for the synchronization signal according to an embodiment of the present disclosure.

Referring to FIG. 7, terminal operations are illustrated with respect to an example 700 of a method for detecting a synchronization signal having 15 kHz subcarrier spacing and an example 710 of a method for detecting a synchronization signal having 60 kHz subcarrier spacing, and even with respect to 30 kHz, the terminal can operate with the same structure. Further, even in case of using a different subcarrier spacing set, the terminal may perform a similar detection operation.

If the maximum subcarrier spacing considered for the synchronization signal is 60 KHz, a synchronization signal 720 having 15 kHz subcarrier spacing has a structure in which a signal pattern "A" 730 is repeated four times in one OFDM symbol period in a time domain. In contrast, a synchronization signal 740 having 60 kHz subcarrier spacing has a structure in which the signal pattern "A" 730 is repeated once in one OFDM symbol period. Accordingly, in case where the terminal detects a reception signal using a detector 750 that can detect the signal "A" 730, peaks 760 having four maximum values are detected in the synchronization signal having 15 kHz subcarrier spacing, and in case of a system having 60 kHz subcarrier spacing, a peak 760 having one maximum value can be detected. Accordingly, the terminal can detect the peaks 760 occurring in a constant period using the signal "A" 730, and can determine the subcarrier spacing used to transmit the synchronization signal through the number of peaks 760.

Figure 8:
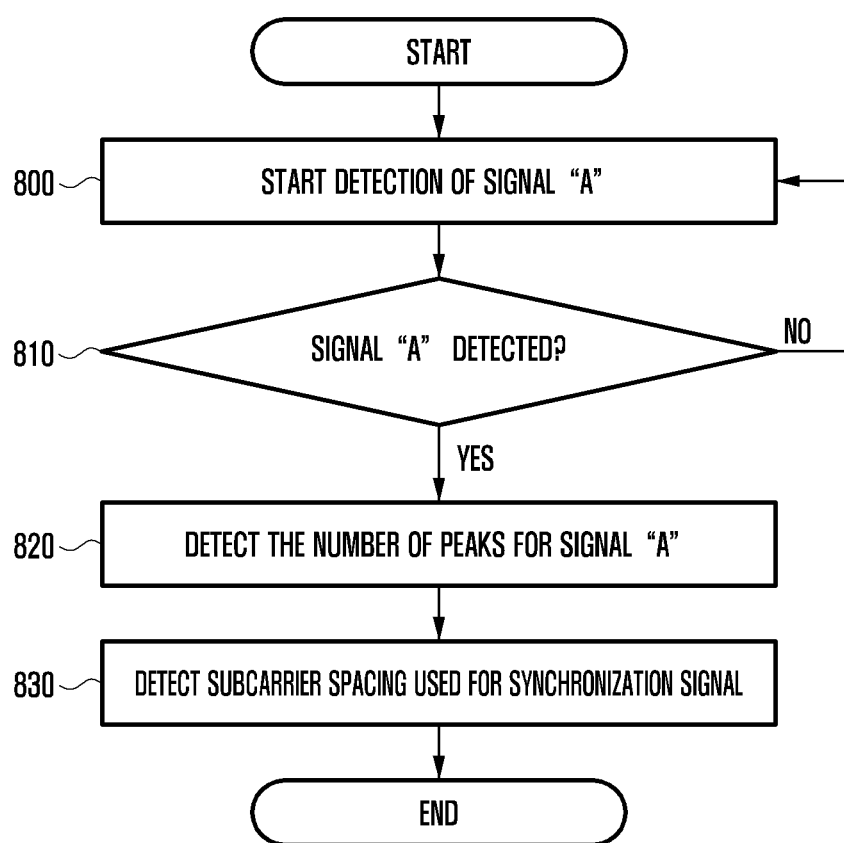
FIG. 8 is a flowchart illustrating a method in which a terminal detects subcarrier spacings by performing an initial access using a synchronization structure proposed in the present disclosure according to an embodiment of the present disclosure.

FIG. 8 is a flowchart illustrating a method in which a terminal detects subcarrier spacings by performing an initial access using a synchronization structure proposed in the present disclosure according to an embodiment of the present disclosure.

Referring to FIG. 8, if the terminal starts its operation through initial power-on, it can detect the signal "A" of the synchronization signal at operation 800 corresponding to an initial access process. Here, the signal "A" means the synchronization signal of the time domain generated at the highest subcarrier spacing considered in the system. If it is assumed that the sequence of the synchronization signal differs for each cell to indicate a different cell ID, the terminal should perform the detection on the assumption of a plurality of sequences "A". If the terminal moves to operation 810 and a detector detects peaks of the signal "A", the terminal moves to operation 829 to detect the number of peaks of the signal "A". Thereafter, the terminal moves to operation 830 to discover the subcarrier spacing used for the synchronization signal in accordance with the number of detected peaks. For example, if the terminal detects the peaks four times through the detector detecting the signal "A" in a state where the subcarrier spacings used for the synchronization signal are 15 kHz, 30 KHz, and 60 KHz, the terminal may assume that the synchronization signal being currently received has been transmitted using 15 kHz subcarrier spacing. If the signal "A" is not detected at operation 810, the terminal moves again to operation 800 to detect the signal "A" of the synchronization signal.

The terminal should perform time and frequency synchronization and cell search through the synchronization signal in the initial access process, and should acquire important information related to system configuration. For example, in LTE, the terminal may perform the time and frequency synchronization and the cell search through PSS and SSS, and may receive a master information block (MIB) that is important information of the system through a physical broadcast channel (PBCH) received thereafter. Further, the terminal may receive a system information block (SIB) that is overall system information related to the system configuration thereafter.

Even in the 5G communication system, in a similar manner to the LTE, the terminal that performs the initial access should be able to receive MIB and SIB through completion of the synchronization through the synchronization signal. In this case, a method is proposed, in which the subcarrier spacings used for the synchronization signal are used in the same manner for physical channels for transmitting the MIB and the SIB. Further, the terminal can also discover time and frequency spacings of a reference signal transmitted together for the purpose of channel estimation of the physical channels for transmitting the MIB and the SIB through the subcarrier spacings of the synchronization signal. Accordingly, if the terminal detects the subcarrier spacings through the synchronization signal, it may perform a reception operation on the assumption that the same subcarrier spacing can be used in the same manner to receive the MIB and the SIB.

Further, in the present disclosure, a case where subcarrier spacings that are different from the subcarrier spacings used by the base station for the synchronization signal transmission are used for the physical channels for transmitting the MIB and the SIB. In this case, in order for the terminal having received the synchronization signal to properly receive the physical channel for transmitting the MIB and the physical channel for transmitting the SIB, there is a need for a method in which the base station notifies the terminal of the subcarrier spacing of the physical channel for transmitting the MIB and the subcarrier spacing of the physical channel for transmitting the SIB.

In order for the terminal having detected the synchronization signal to discover the subcarrier spacing of the physical channel for transmitting the MIB, the base station may map the sequence of a specific synchronization signal to the subcarrier spacing of the physical channel of the MIB. In case where the subcarrier spacing information for transmitting the MIB is mapped to the specific sequence of the synchronization signal, the terminal may receive the MIB using the subcarrier spacing mapped to the corresponding sequence after detecting the corresponding sequence. For example, if it is designated that sequence #1 used for the synchronization signal means 15 kHz subcarrier spacing for the MIB transmission and sequence #2 means 30 kHz subcarrier spacing for the MIB transmission, and if the terminal detects sequence #2 from the synchronization signal, the terminal may assume 30 kHz as the subcarrier spacing in receiving the physical channel including the MIB. Accordingly, the terminal attempts to receive the MIB on the assumption that the MIB is transmitted using the detected subcarrier spacing based on the synchronization signal sequence after detecting the synchronization signal.

Further, in order for the terminal having received the synchronization signal and the MIB to discover the subcarrier spacing of the physical channel for transmitting the SIB, a method may be considered, in which the base station configures subcarrier spacing information of the physical channel for transmitting the SIB to the terminal. The SIB may be divided into several SIBs including information to be transmitted. For example, the base station may divide the system information to be transmitted to the terminals into SIB1 to SIBx (here, x means a certain numeral) to be transmitted. For example, after the terminal receives the MIB, the base station may transmit important information related to system connection, which the terminal should first acquire after receiving the MIB, through SIB1, and may transmit information related to a random access of the terminal through SIB2.

On the assumption of the above-described case, a method for configuring the subcarrier spacing of SIB1, which the terminal should first receive after acquiring the MIB, through the MIB may be proposed. In this case, one field including a predetermined number of bits may be included in the MIB in order to configure the subcarrier spacing of SIB1. After receiving the MIB, the terminal may acquire the field for configuring the subcarrier spacing of the physical channel for transmitting SIB1 in the corresponding MIB, and may receive SIB1 using the corresponding subcarrier spacing. It is proposed to configure the subcarrier spacing of the physical channel for transmitting SIBx that the terminal should receive after SIB1 through SIB1. For this, a plurality of fields including a predetermined number of bits are included in SIB1, and the terminal may receive SIB1 and may acquire the field for transferring the information of the subcarrier spacing of SIBx. Thereafter, in receiving the physical channel of the corresponding SIBx, the terminal may receive SIBx using the subcarrier spacing information of SIBx configured in SIB1.

Further, in the present disclosure, it may be considered that the terminal receives a downlink signal or transmits an uplink signal using a downlink synchronization signal and a subcarrier spacing that is different from the subcarrier spacing used for the physical channel for transmitting MIB and SIB. Since the base station does not know the situation of the terminal existing in the cell, it is unable to transmit a signal using the subcarrier spacing that is considered as optimum for each terminal, and is unable to receive a signal transmitted by the terminal using another subcarrier spacing. In contrast, the terminal may measure the multi-path delay spread and Doppler spread in consideration of the channel situation and moving speed of the terminal, and may request the base station to use the subcarrier spacing suitable for the terminal to receive the downlink signal and the subcarrier spacing suitable to transmit the uplink signal.

Accordingly, in the present disclosure, a method by the terminal for requesting subcarrier spacings for downlink signal reception and uplink signal transmission using a random access preamble is proposed. In order to request the downlink and uplink subcarrier spacings desired by the terminal itself, the terminal may use the random access preamble in an initial access state. The terminal may request the subcarrier spacing from the base station by randomly selecting and transmitting the random access preamble from a random access preamble set that is mapped to the subcarrier spacing in a one-to-one manner among the whole random access preambles. That is, the base station may configure one set by tying a plurality of preambles, and the whole random access preambles may be composed of a plurality of preamble sets. In this case, each of the respective preamble sets may be used to indicate one subcarrier spacing.

The base station may configure the random access preamble set information and related subcarrier spacing information to the terminals in the cell in a cell-common manner. For example, if it is assumed that there are 64 random access preambles in total, preambles having indexes 0 to 31 may constitute one preamble set, and preambles having the remaining indexes may constitute a second set. The first set may be used to request 15 kHz subcarrier spacing, and the second set may be used to request 30 kHz subcarrier spacing. In this case, if the terminal transmits the random access preamble using the preamble having index #0 and the base station detects the corresponding sequence, the base station may analogize that the corresponding terminal has requested 15 kHz as the subcarrier spacing.

Further, if the terminal transmits the preamble requesting a specific subcarrier spacing in the random access process, it attempts downlink signal reception on the assumption that a random access response is received through the use of the requested subcarrier spacing in receiving the random access response thereafter. Further, the terminal having succeeded in reception of the random access response transmits the signal on the assumption that it is possible to transmit the uplink signal through the subcarrier spacing requested through the random access preamble even if there is no special configuration in relation to the subcarrier spacing thereafter.

Figure 9:
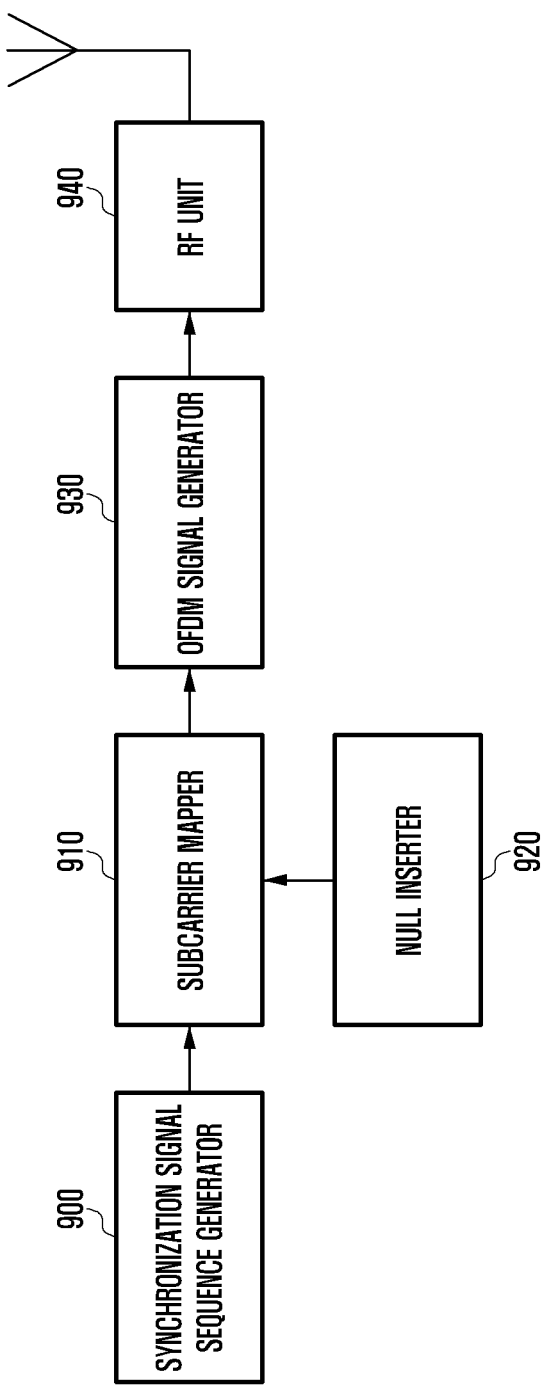
FIG. 9 is a block diagram illustrating the configuration of a transmission unit of a base station for performing the above-described embodiments of the present disclosure.
Figure 10A:
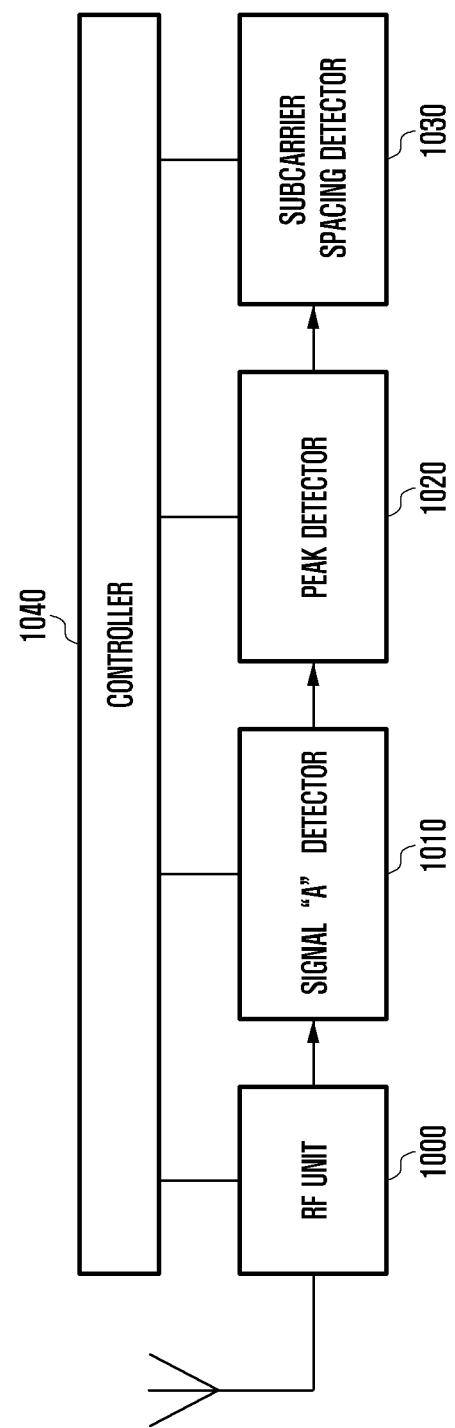
FIG. 10A is a block diagram illustrating the internal structure of a terminal reception unit according to an embodiment of the present disclosure.
Figure 10B:
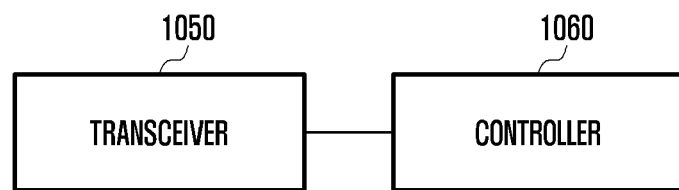
FIG. 10B is a block diagram illustrating the configuration of a base station according to an embodiment of the present disclosure.

FIGS. 9, 10A and 10B are block diagrams illustrating a transmission unit of a base station and a reception unit of a terminal for performing embodiments of the present disclosure. The transmission unit of the base station and the reception unit of the terminal should operate in accordance with initial access method and device of a 5G communication system proposed in the above-described embodiments.

FIG. 9 is a block diagram illustrating the internal structure of a base station transmission unit according to an embodiment of the present disclosure. Referring to FIG. 9, the transmission unit of the base station according to the present disclosure is composed of a synchronization signal sequence generator 900, a subcarrier mapper 910, a null inserter 920, an OFDM signal generator 930, an RF unit 940, and an antenna. Further, the base station according to the present disclosure may be composed of a controller and a transceiver including the transmission unit, and the controller may control the transceiver to perform embodiments of the present disclosure. The synchronization signal sequence generator 900 generates sequences of a synchronization signal for the terminal to discover the corresponding cell number in accordance with an ID of the cell managed by the corresponding base station. The synchronization signal sequences generated by the sequence generator 900 are input to the subcarrier mapper 910. Further, the null inserter 920 generates and inputs symbols having a value of "0" to the subcarrier mapper 910. The subcarrier mapper 910 properly maps the synchronization signal sequences and the null to the subcarriers in accordance with the subcarriers used for the synchronization signal in the subcarrier spacing set considered by the base station. The OFDM signal generator 930 generates a time-domain OFDM signal using the subcarriers mapped through the subcarrier mapper 910, and transfers the generated OFDM signal to the RF unit 940. The RF unit 940 converts a baseband signal into a transition band signal, and transfers the converted transition band signal to the antenna to transmit the corresponding signal through the antenna.

FIG. 10A is a block diagram illustrating the internal structure of a terminal reception unit according to an embodiment of the present disclosure. Referring to FIG. 10A, a terminal transmission unit is composed of an RF unit 1000, a signal "A" detector 1010, a peak detector 1020, a subcarrier spacing detector 1030, and a controller 1040. Further, the terminal according to the present disclosure may be composed of a transceiver including the terminal transmission unit and the controller 1040, and the controller may control the transceiver to perform embodiments of the present disclosure. The RF unit 1000 performs a role of converting a received transition band signal into a baseband signal. The converted baseband signal is input to the signal "A" detector 1010 that is a detector detecting a synchronization signal for the signal received through the signal "A" detector 1010. As exemplified in FIG. 7, the signal "A" is a time-domain signal of the synchronization signal generated at the largest subcarrier spacing supported by the base station, and matched filtering is performed with respect to the corresponding signal. The matched filtering output from the signal "A" detector 1010 is transferred to the peak detector 1020 to detect peaks thereof, and the number of detected peaks is transferred to the subcarrier spacing detector 1030. The subcarrier spacing detector may estimate the subcarrier spacing in accordance with the number of detected peaks. The controller 1040 may control the RF unit 1000, the signal "A" detector 1010, the peak detector 1020, and the subcarrier spacing detector 1030 constituting the terminal.

FIG. 10B is a block diagram illustrating the configuration of a base station according to an embodiment of the present disclosure. Referring to FIG. 10B, the base station according to the present disclosure may be composed of a transceiver 1050 and a controller 1060, and the controller 1060 may control the transceiver 1050 to transmit and receive the signal. Specifically, according to an embodiment of the present disclosure, the controller may generate at least one of a synchronization signal, MIB, and SIB, and may transmit at least one of the synchronization signal, MIB, and SIB using the transceiver.

Second Embodiment

In general, a mobile communication system has been developed to provide a voice service while securing user activity. However, the mobile communication system has gradually extended its domain up to data service providing in addition to the voice service, and at present, it has been developed up to the level capable of providing a high-speed data service. However, since resource shortage phenomenon occurs under the current mobile communication system and users require higher-speed services, there has been a need for a more developed mobile communication system.

As one system that has been developed as the next-generation mobile communication system to meet such a need, standardization work for long term evolution (LTE) is in progress in the $3^{rd}$ Generation Partnership Project (3GPP). The LTE is a technology implementing high-speed packet based communication having a transmission speed of about 100 Mbps at maximum. For this, various schemes have been discussed, for example, a scheme for reducing the number of nodes located on a communication path through simplification of a network structure and a scheme for maximally approaching radio protocols to radio channels.

The LTE system adopts a hybrid automatic repeat request (HARQ) scheme in which a physical layer retransmits corresponding data if decoding failure occurs during initial transmission. According to the HARQ scheme, a receiver transmits information (negative acknowledgement (NACK)) for notifying a transmitter of decoding failure if the receiver is unable to accurately decode data, and the transmitter may make a physical layer retransmit the corresponding data. The receiver may combine the data that is retransmitted by the transmitter with the previous data of which the decoding has failed to heighten the data reception performance. Further, if the receiver has accurately decoded the data, the receiver may transmit information (acknowledgement (ACK)) for notifying the transmitter of decoding success, and thus the transmitter can transmit new data.

Figure 11:
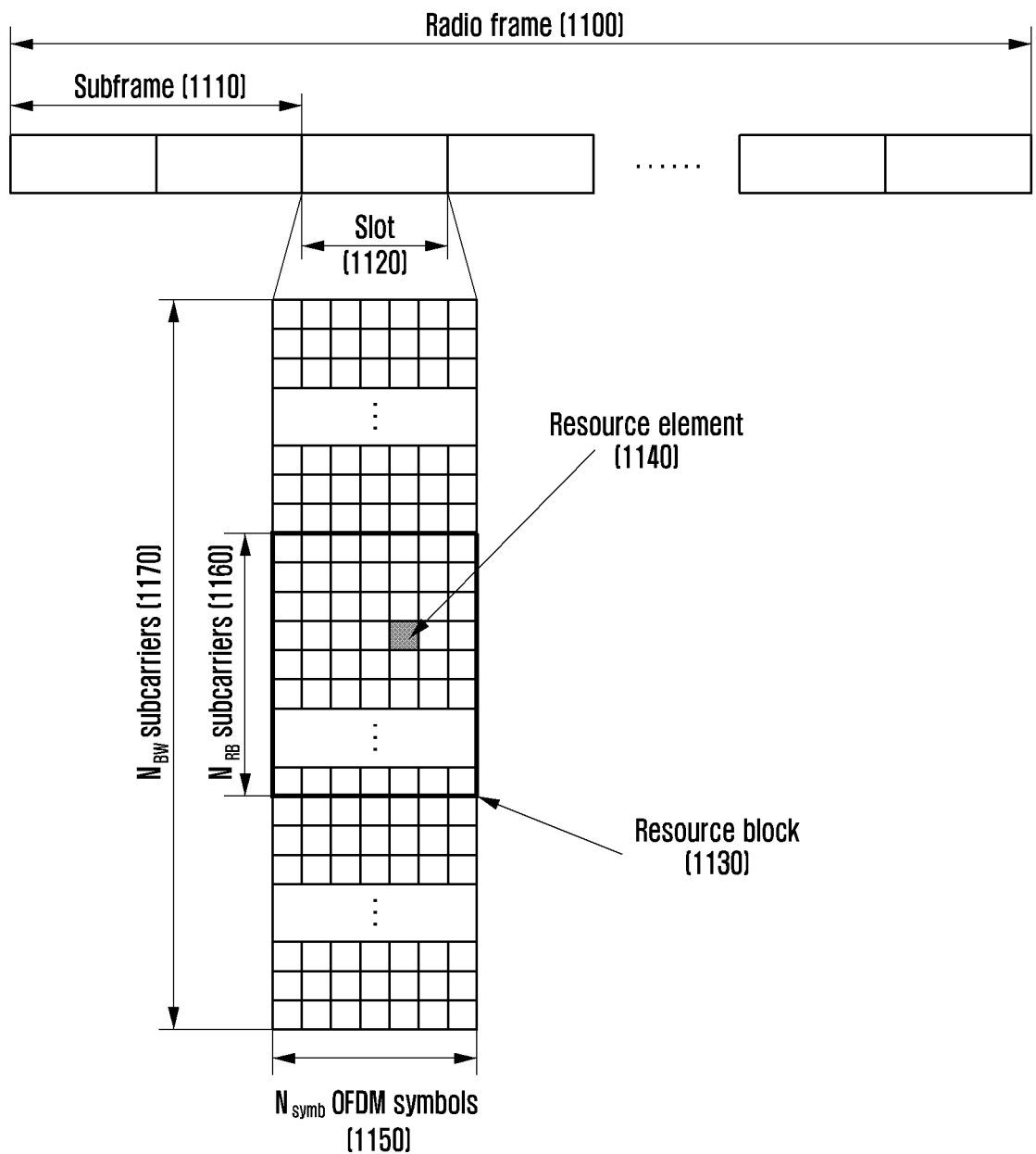
FIG. 11 is a diagram illustrating the basic structure of a time-frequency domain in an LTE system.

FIG. 11 is a diagram illustrating the basic structure of a time-frequency domain that is a radio resource region in which data or a control channel is transmitted in a downlink in an LTE system.

Referring to FIG. 1, a horizontal axis represents a time domain, and a vertical axis represents a frequency domain. In the time domain, the minimum transmission unit is an OFDM symbol, and $N_{symb}$ OFDM symbols 1150 constitute one slot 1120, and two gathered slots constitute one subframe 1110. The length of the slot is 0.5 ms, and the length of the subframe is 1.0 ms. Further, a radio frame 1100 is a time-domain unit that is composed of 10 subframes. In the frequency domain, the minimum transmission unit is a subcarrier, and the transmission bandwidth of the whole system is composed of $N_{BW}$ subcarriers 1170 in total.

In the time-frequency domain, the basic unit of resources is a resource element (RE) 1140 that may be expressed by an OFDM symbol index and a subcarrier index. A resource block (RB) (or physical resource block (PRB)) 1130 is defined by $N_{symb}$ successive OFDM symbols 1150 in the time domain and $N_{RB}$ successive subcarriers 1160 in the frequency domain. Accordingly, one RB 1130 is composed of $N_{symb} \times N_{RB}$ REs 1140. In general, the minimum transmission unit of data is the RB unit, and in the LTE system, $N_{symb}$d=7, $N_{RB}$=12, and $N_{BW}$ and $N_{RB}$ are in proportion to the bandwidth of the system transmission band.

The data rate is increased in proportion to the number of RBs that are scheduled in the terminal. The LTE system may define and operate 6 transmission bandwidths. In case of a frequency division duplex (FDD) system that operates to discriminate a downlink and an uplink by means of the frequency, the downlink transmission bandwidth and the uplink transmission bandwidth may differ from each other.

A channel bandwidth represents an RF bandwidth that corresponds to the system transmission bandwidth. Table 1 below presents the corresponding relationship between the system transmission bandwidth and the channel bandwidth defined in the LTE system. For example, the LTE system having 10 MHz channel bandwidth has the transmission bandwidth that is composed of 50 RBs.

TABLE 1

| Channel bandwidth BWChannel [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

Downlink control information is transmitted within initial N OFDM symbols in the subframe. In general, N={1, 2, 3}. Accordingly, in accordance with the amount of control information to be transmitted to the current subframe, the value N is varied for each subframe. The control information includes a control channel transmission interval indicator indicating how many OFDM symbols the control information is transmitted through, scheduling information on downlink data or uplink data, and HARQ ACK/NACK signal.

In the LTE system, the scheduling information on the downlink data or the uplink data is transferred from the base station to the terminal through downlink control information (DCI). The uplink (UL) means a radio link on which the terminal transmits data or a control signal to the base station, and the downlink (DL) means a radio link on which the base station transmits data or a control signal to the terminal. The DCI is defined in various formats, and the respective formats are applied depending on whether the DCI is scheduling information on uplink data (UL grant) or scheduling information on downlink data (DL grant), whether the DCI is a compact DCI having a small size of the control information, whether spatial multiplexing using multiple antennas is applied, and whether the DCI is a DCI for power control. For example, DCI format 1 that is the scheduling control information on the downlink data (DL grant) is configured to include at least the following control information.

Resource allocation type 0/1 flag: This notifies of whether a resource allocation scheme is of type 0 or type 1. The type 0 allocates resources in the unit of a resource block group (RBG) through application of a bitmap scheme. In the LTE system, the basic unit of scheduling is an RB that is expressed as time and frequency domain resource, and the RBG is composed of a plurality of RBs, and becomes the basic unit of scheduling in the type 0 scheme. The type 1 allocates a specific RB in the RBG.

Resource block assignment: This notifies of an RB that is allocated for data transmission. An expressed resource is determined in accordance with the system bandwidth and the resource allocation scheme.

Modulation and coding scheme (MCS): This notifies of a modulation scheme that is used for data transmission and the size of a transport block that is data to be transmitted.

HARQ process number: This notifies of a process number of a HARQ.

New data indicator: This notifies of whether transmission is HARQ initial transmission or retransmission.

Redundancy version: This notifies of a redundancy version of a HARQ.

Transmission power control (TCP) command for a physical uplink control channel (PUCCH): This notifies of a transmission power control command for a PUCCH that is an uplink control channel.

The DCI passes through a channel coding and modulation process, and is transmitted on a physical downlink control channel (PDCCH) that is a downlink physical control channel or enhanced PDCCH (EPDCCH). Hereinafter, the DCI transmission on the PDCCH may be mixedly used with the PDCCH transmission. This may also be applied to other similar channels.

In general, the DCI is independently channel-coded with respect to respective terminals, and is configured as an independent PDCCH to be transmitted. In the time domain, the PDCCH is mapped during the control channel transmission interval to be transmitted. The frequency domain mapping location of the PDCCH is determined by an Identifier (ID) of each terminal, and is spread over the whole system transmission band.

The downlink data is transmitted on a physical downlink shared channel (PDSCH) that is a physical downlink data channel. The PDSCH is transmitted after the control channel transmission period, and scheduling information, such as a detailed mapping location in the frequency domain and the modulation scheme, is notified by the DCI transmitted through the PDCCH. Hereinafter, downlink data transmission on the PDSCH may be mixedly used with the PDSCH transmission. This may also be applied to other similar channels.

Through an MCS composed of 5 bits among the control information constituting the DCI, the base station notifies the terminal of the modulation scheme that is applied to the PDSCH to be transmitted to the terminal and a transport block size (TBS) of data to be transmitted. The TBS corresponds to the data size before a channel coding for error correction is applied to the data (TB), which the base station intends to transmit.

The modulation scheme supported in the LTE system is quadrature phase shift keying (QPSK), 16 quadrature amplitude modulation (16QAM), or 64QAM, and respective modulation orders $Q_m$ correspond to 2, 4, and 6. That is, in case of the QPSK modulation, 2 bits per symbol may be transmitted, and in case of the 16QAM modulation, 4 bits per symbol may be transmitted. Further, in case of the 64QAM modulation, 6 bits per symbol may be transmitted.

In 3GPP LTE Release 10 (Rel-10), as compared with LTE Rel-8, bandwidth extension technology has been adopted to support higher data transmission rate. The above-described technology called bandwidth extension or carrier aggregation (CA) may increase the data transmission rate as much as the extended band as compared with an LTE Rel-8 terminal transmitting data in one band. Each of the respective bands is called a component carrier (CC), and the LTE Rel-8 terminal is prescribed to have one component carrier with respect to the downlink or the uplink. Further, the downlink component carrier and the uplink component carrier connected through system information block (SIB)-2 are tied to be called a cell. The SIB-2 connection relationship between the downlink component carrier and the uplink component carrier is transmitted as a system signal or a higher signal. The terminal supporting the CA may receive the downlink data and may transmit the uplink data through a plurality of serving cells.

In Rel-10, if the base station is in a situation where it is difficult for the base station to transmit the PDCCH to a specific terminal in a specific serving cell, it may transmit the PDCCH in another serving cell, and may configure a carrier indicator field (CIF) as a field notifying that the corresponding PDCCH indicates data transmission on a PDSCH of another serving cell or a physical uplink shared channel (PUSCH). The CIF may be configured to the terminal supporting the CA. The CIF is determined to indicate another serving cell through addition of 3 bits to the DCI transmitted in the specific serving cell, and the CIF is included only in case of performing cross carrier scheduling. If the CIF is not included, the cross carrier scheduling is not performed. If the CIF is included in downlink assignment information (it may be understood as DL assignment or DL grant), the CIF is defined to indicate a serving cell to which the PDSCH that is scheduled by the downlink assignment information is to be transmitted and to indicate a serving cell to which the PUSCH that is scheduled by the uplink assignment information is to be transmitted.

As described above, in LTE-10, the carrier aggregation that is the bandwidth extension technology is defined, and a plurality of serving cells may be configured to the terminal. Further, the terminal periodically or aperiodically transmits channel information on the plurality of serving cells to the base station for data scheduling of the base station. Further, the base station schedules and transmits data for each carrier, and the terminal transmits A/N feedback for the data transmitted for each carrier. In LTE Rel-10, it is designed to transmit the A/N feedback of 21 bits at maximum, and if the transmission of the A/N feedback overlaps the transmission of the channel information on one subframe, it is designed to transmit the A/N feedback and to discard the channel information. In LTE Rel-11, it is designed to transmit the A/N feedback of 22 bits at maximum and channel information of one cell using PUCCH format 3 on the transmission resource of the PUCCH format 3 through multiplexing of the A/N feedback and the channel information of one cell.

In LTE-13, maximally 32 serving cell configuration scenarios are assumed, and the concept of extending the number of serving cells maximally up to 32 using not only licensed bands but also unlicensed bands has been introduced. Further, in consideration of the situation where the number of licensed bands, such as LTE frequency, is limited, standardization of the technology to provide an LTE service in an unlicensed band, such as 5 GHz band, has been completed, and this is called a licensed assisted access (LAA). In the LAA, it is supported that an LTE cell that is a licensed band is operated as a primary cell (P cell) and an LAA cell that is an unlicensed band is operated as a secondary cell (S cell) through application of the carrier aggregation technology in the LTE. Accordingly, feedback generated in the LAA cell that is an S cell like the LTE should be transmitted only from the P cell, and in the LAA cell, downlink subframes and uplink subframes can be freely applied. Unless separately described in the description, LTE may be called to include all LTE evolved technology, such as LTE-A and LAA.

On the other hand, new radio access technology (NR) that is a beyond LTE communication system, that is, 5G wireless cellular communication system (in the description, referred to as "5G"), is required to freely reflect various requirements of users and service providers, and thus services that satisfy the various requirements should be supported.

Accordingly, 5G may be defined as technology to satisfy the requirements selected for respective 5G oriented services, such as enhanced mobile broadband (hereinafter, "eMBB"), massive machine type communication (hereinafter, "mMTC"), and ultra-reliable and low latency communications (hereinafter, "URLLC"), among requirements, such as 20 Gbps of the terminal maximum transmission speed, 500 km/h of the terminal maximum speed, 0.5 ms of the maximum delay time, and 1,000,000 UE/km² of the terminal connection density.

For example, in order to provide eMBB in 5G, from the viewpoint of one base station, it is required to provide 20 Gbps of terminal maximum transmission speed through downlink and to provide 10 Gbps of terminal maximum transmission speed through uplink. At the same time, bodily sensed terminal average transmission speed should be increased. In order to satisfy the requirements as described above, there is a need for improvement of transmission/reception technology including more improved multiple-input multiple-output (MIMO) transmission technology.

Also, in order to support an application service, such as Internet of things (IoT) in 5G, an mMTC is considered. In order to efficiently provide the IoT using the mMTC, requirements of massive terminal connection support, terminal coverage improvement, improved battery time, and terminal cost reduction should be satisfied. Since the IoT is attached to several sensors and various machines to provide communication functions, it is necessary to support a large number of terminals (e.g., 1,000,000 UE/km²) in the cell. Further, since there is high possibility that due to the service characteristics, the terminal is located in a shaded area, such as underground of a building or an area where the cell is not covered, a wider coverage than the coverage provided by the eMBB is necessary. There is a high possibility that the mMTC is configured as a cheap terminal, and since it is difficult to frequently exchange the battery of the terminal, a very long battery life time is required.

Last, in case of the URLLC that is a cellular based wireless communication used for a specific purpose, it is a service used for remote control of a robot or machine device, industry automation, unmanned aerial vehicle, remote health care, and emergency situation alarm, and thus it is necessary to provide communication having low latency and ultra-reliability. For example, the URLLC should satisfy the maximum delay time that is shorter than 0.5 ms, and also should satisfy a packet error rate that is equal to or lower than $10^{-5}$. Accordingly, for the URLLC, transmit time interval (TTI) that is shorter than that of a 5G service, such as eMBB, should be provided, and design requirement in which wide resources should be allocated in the frequency band should be satisfied. In the present disclosure, although "subframe" is used with respect to the transmit time interval, "subframe", "slot", "mini slot", and "TTI" may have the same meaning in all.

Services considered in the 5G wireless cellular communication system as described above should be provided as one framework. That is, for efficient resource management and control, it is preferable that respective services are not independently operated, but are integrally controlled and transmitted as one system.

Figure 12:
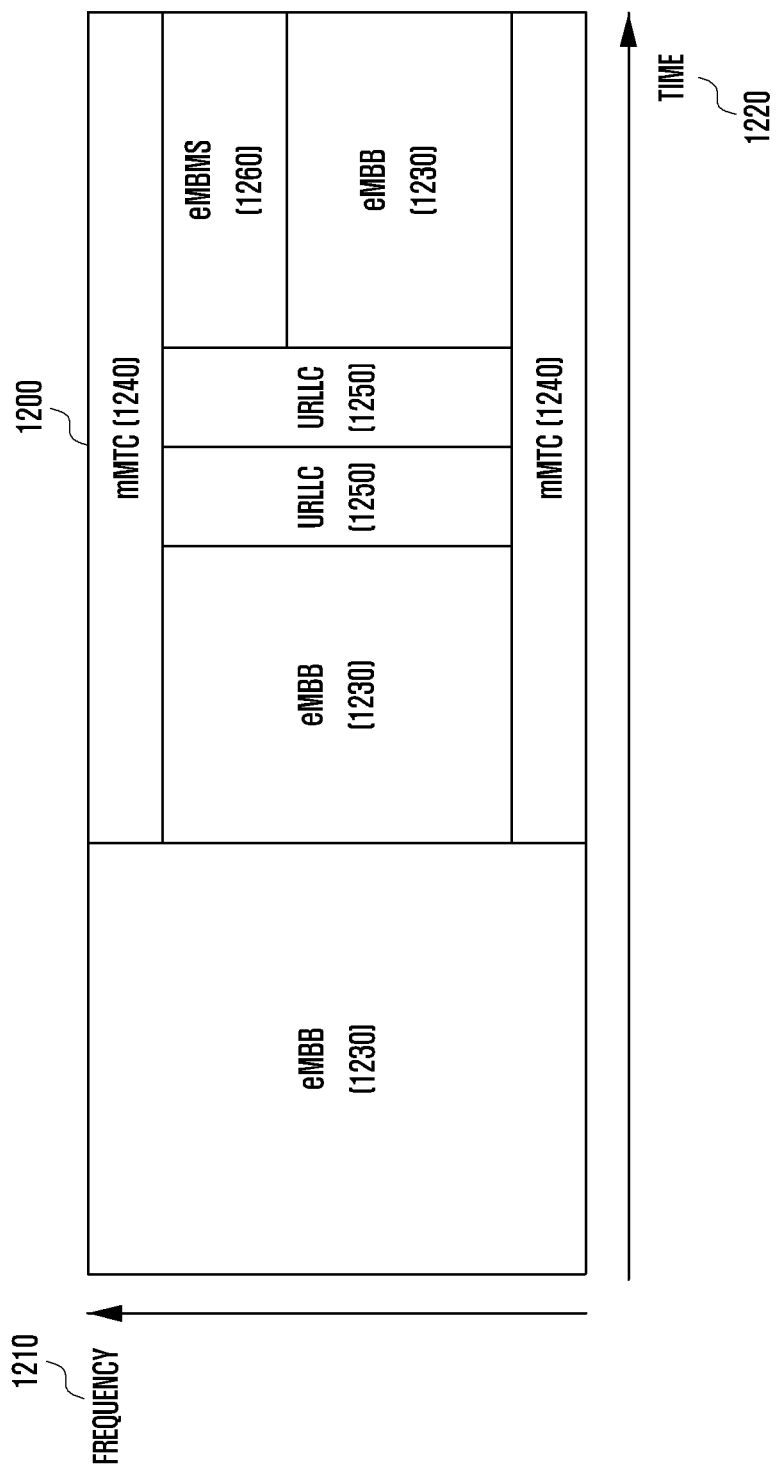
FIG. 12 is a diagram illustrating an example in which 5G services are multiplexed and transmitted in one system.

FIG. 12 is a diagram illustrating an example in which services being considered in 5G are multiplexed through one system to be transmitted.

In FIG. 12, frequency-time resource 1200 used by 5G may be composed of a frequency axis 1210 and a time axis 1220. In FIG. 12, it is exemplified that eMBB 1230, mMTC 1240, and URLLC 1250 are operated by a 5G base station in one framework. Further, as a service that may be additionally considered in 5G, enhanced mobile broadcast/multicast service (eMBMS) 1260 for providing a cellular-based broadcasting service may be considered. The services being considered in 5G, such as eMBB 1230, mMTC 1240, URLLC 1250, and eMBMS 1260, may be multiplexed to be transmitted through time-division multiplexing (TDM) or frequency division multiplexing (FDM) in one system frequency bandwidth operated in 5G, and spatial division multiplexing may also be considered.

In case of eMBB 1230, it is preferable to occupy and transmit the maximum frequency bandwidth at a certain specific time to provide increased data transmission speed as described above. Accordingly, in the service of eMBB 1230, it is preferable that the service is TDM multiplexed with other services in the system transmission bandwidth 1200 to be transmitted, and it is also preferable that the service is FDM-multiplexed with other services in the system transmission bandwidth as needed by other services.

In case of mMTC 1240, in order to secure a wide coverage in contrast with other services, an increased transmission interval is required, and the coverage can be secured through repeated transmission of the same packet in the transmission interval. At the same time, in order to reduce terminal complexity and terminal costs, the transmission bandwidth that can be received by the terminal is limited. In consideration of such requirements, it is preferable that mMTC 1240 is FDM-multiplexed with other services in the 5G transmission system bandwidth 1200 to be transmitted.

In order to satisfy ultra-low latency requirements requested by the service, it is preferable that URLLC 1250 has a short transmit time interval as compared with other services. At the same time, in order to satisfy ultra-reliable requirements, it is necessary to have a low coding rate, and thus it is preferable to have a wide bandwidth on the frequency side. In consideration of the requirements of the URLLC 1250, it is preferable that the URLLC 1250 is TDM-multiplexed with other services in the 5G transmission system bandwidth 1200.

In order to satisfy the requirements required by the respective services, the respective services as described above may have different transmission/reception techniques and transmission/reception parameters. For example, the respective services may have different numerologies in accordance with the respective service requirements. Here, the numerology includes a cyclic prefix (CP) length, subcarrier spacing, OFDM symbol length, and transmit interval length (TTI) in a communication system based on orthogonal frequency division multiplexing (OFDM) or orthogonal frequency division multiple access (OFDMA).

As an example in which the services have different numerologies, eMBMS 1260 may have a long CP length as compared with other services. Since eMBMS transmits a broadcasting-based upper traffic, the same data can be transmitted in all cells. In this case, as seen from the terminal, if signals received from a plurality of cells arrive within the CP length, the terminal can receive and decode all the signals, and thus a single frequency network (SFN) diversity gain can be obtained. Accordingly, even the terminal located on the cell boundary can receive the broadcasting information without coverage limits. However, if the CP length is relatively long as compared with that of other services, waste due to a CP overhead occurs. At the same time, a long OFDM symbol length as compared with that of other services is required, and thus a narrower subcarrier interval as compared with that of other services is required.

Further, as an example in which different numerologies are used between services in 5G, in case of the URLLC, since a short TTI is required as compared with that of other services, a shorter OFDM symbol length is required, and at the same time, a wider subcarrier spacing may be required.

As described above, in order to satisfy various requirements in 5G, requirements for various services are described, and requirements for the representatively considered services have been described.

The frequency range in which 5G is considered to be operated reaches several GHz to several tens of GHz, and in the several tens of GHz band having low frequency, a frequency division duplex (FDD) system is preferred rather than a time division duplex (TDD) system, and in the several tens of GHz band having high frequency, it is considered that the TDD system is more suitable than the FDD system. However, in contrast with the FDD that seamlessly provides uplink/downlink transmission resources through putting of separate frequencies for the uplink/downlink transmission, the TDD should support all the uplink/downlink transmission at one frequency, and in accordance with time, it provides only the uplink resource or downlink resource. If it is assumed that uplink or downlink transmission of the URLLC service is necessary in the TDD system, it becomes difficult to satisfy the ultra-low latency requirements required by the URLLC due to the delay up to the time when the uplink or downlink resource appears. Accordingly, in case of the TDD, in order to satisfy the ultra-low latency requirements of the URLLC, there is a need for a method for dynamically changing the subframe uplink or downlink depending on whether the URLLC data corresponds to uplink transmission or downlink transmission.

On the other hand, even in case of multiplexing services and technologies for forward 5G phase 2 or beyond 5G into 5G operating frequencies in 5G, it is required to provide the 5G phase 2 or beyond 5G technology and services so that there is no backward compatibility problem in operating the 5G. The requirement conditions are called forward compatibility, and technologies for satisfying the forward compatibility should be considered in case of designing the 5G.

In the initial LTE standardization stage, consideration of the forward compatibility is unprepared, and thus there may be a limit in providing a new service in the LTE framework. For example, in case of the enhanced machine type communication (eMTC) applied in LTE release-13, communication becomes possible only in the frequency band corresponding to 1.4 MHz regardless of the system bandwidth provided by a serving cell in order to reduce the terminal costs through reduction of the terminal complexity. Accordingly, since the terminal that supports the eMTC cannot receive the PDCCH transmitted over the full band of the existing system bandwidth, a signal is unable to be received at the time interval when the PDCCH is transmitted. Accordingly, the 5G communication system should be designed so that services considered after the 5G communication system efficiently coexists with the 5G communication system. In the 5G communication system, for forward compatibility, resources should be able to be freely allocated so that services to be considered forward can be freely transmitted in the time-frequency resource region supported in the 5G communication system. Accordingly, in order to support the forward compatibility in the 5G communication system, there is a need for a method for freely allocating time-frequency resources.

In the 5G communication system, one TTI may be defined as one slot, and may be composed of 14 OFDM symbols or 7 OFDM symbols. Accordingly, in case of 15 kHz subcarrier spacing, one slot has a length of 1 or 0.5 ms. Further, in the 5G, for emergency transmission and transmission in an unlicensed band, one TTI may be defined as one mini-slot or sub-slot, and one mini-slot may have one to ((the number of OFDM symbols of a slot)−1) OFDM symbols. For example, if the length of one slot is 14 OFDM symbols, the length of a mini-slot may be determined as one of 1 to 13 OFDM symbols.

Further, instead of separately defining the terms "slot" and "mini-slot", the TTI may be defined only by the slot. Accordingly, the length of one slot may be differently configured for each terminal, and one slot may have one to (the number of OFDM symbols in a slot) OFDM symbols. The length of the slot or mini-slot may be defined in the standards, or may be transmitted to the terminal through a higher signal or system information. The slot or mini-slot may be defined to have various transmission formats, and may be classified into the following formats.

DL only slot or full DL slot: The DL only slot is composed of only DL interval, and only DL transmission is supported.

DL centric slot: The DL centric slot is composed of a DL interval, a GP, and a UL interval, and the number of OFDM symbols in the DL interval is larger than the number of OFDM symbols in the UL interval.

UL centric slot: The UL centric slot is composed of a DL interval, a GP, and a UL interval, and the number of OFDM symbols in the DL interval is smaller than the number of OFDM symbols in the UL interval.

UL only slot or full UL slot: The UL only slot is composed of only a UL interval, and only UL transmission is supported.

Although only the slot format is classified as described above, the mini-slot can also be divided in the same classification method. That is, the mini-slot may also be divided into a DL only mini-slot, a DL centric mini-slot, a UL centric mini-slot, and a UL only mini-slot.

In the present disclosure, the slot formats as described above are described as the term "subframes" having the same meaning.

Hereinafter, preferred embodiments of the present disclosure will be described in detail with reference to the accompanying drawings. In the accompanying drawings, it is to be noted that the same reference numerals are used for the same constituent elements. Further, a detailed description of known functions and configurations will be omitted if it obscures the subject matter of the present disclosure.

Further, in describing embodiments of the present disclosure in detail, LTE and 5G systems will be the main subject. However, the main subject of the present disclosure may also be applied to other communication systems having similar technical backgrounds or channel types through slight modifications thereof in a range that does not greatly deviate from the scope of the present disclosure through the judgment of those skilled in the art to which the present disclosure pertains.

Hereinafter, a 5G communication system in which 5G cells operate in a stand-alone manner or a 5G communication system in which 5G cells are combined with other stand-alone 5G cells through dual connectivity or carrier aggregation to operate in a non-stand-alone manner will be described.

Figure 13A:
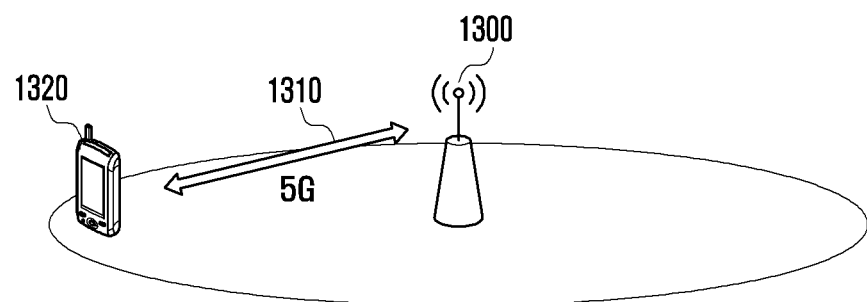
FIG. 13A is a diagram illustrating an example of a communication system to which the present disclosure is applied.
Figure 13B:
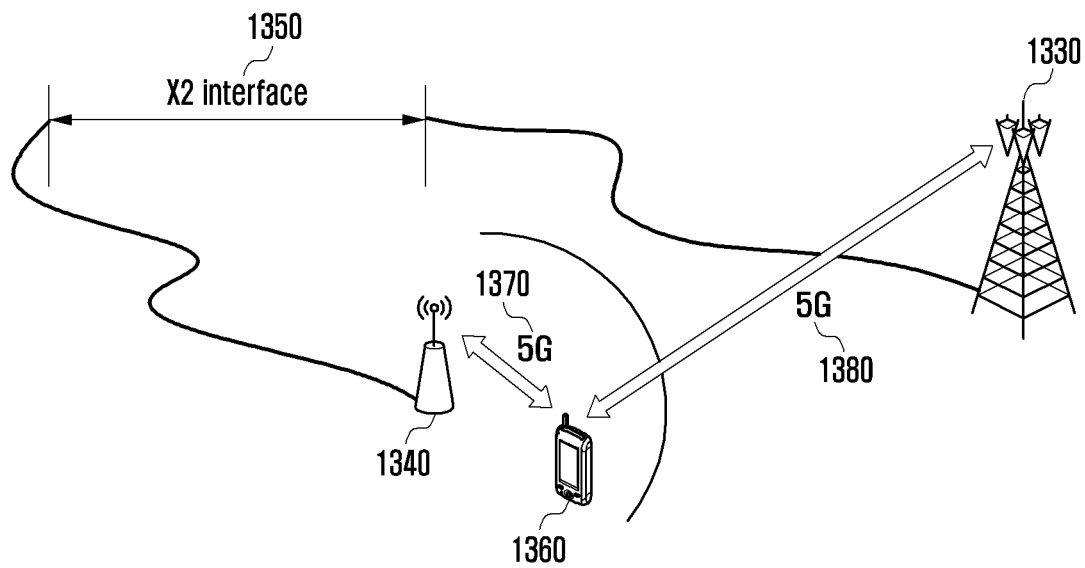
FIG. 13B is a diagram illustrating another example of a communication system to which the present disclosure is applied.

FIGS. 13A and 13B are diagrams illustrating first and second embodiments of a communication system to which the present disclosure is applied. Schemes proposed in the present disclosure can be applied to the system of FIG. 13A and the system of FIG. 13B in all.

Referring to FIG. 13A, a case where a 5G cell 1310 operates in a stand-alone manner in one base station 1300 in a network is illustrated. A terminal 1320 is a 5G capable terminal having a 5G transmission/reception module. The terminal 1320 acquires synchronization through a synchronization signal transmitted from a 5G stand-alone cell 1310, receives system information, and then attempts a random access to the 5G base station 1300. The terminal 1320 transmits and receives data through the 5G cell 1310 after completing an RRC connection with the 5G base station 1300. In this case, a duplex type of the 5G cell 1310 is not limited. In the system of FIG. 13A, the 5G cell may be provided with a plurality of serving cells.

Referring to FIG. 13B, a case where a 5G stand-alone base station 1330 and a 5G non-stand-alone base station 1340 for increasing the data rate are installed is illustrated. The terminal 1360 is a 5G capable terminal having a 5G transmission/reception module for a plurality of base stations to perform 5G communication. The terminal 1360 acquires synchronization through a synchronization signal transmitted from the 5G stand-alone base station 1330, receives system information, and then attempts a random access to the 5G stand-alone base station 1330. The terminal 1360 additionally configures a 5G non-stand-alone cell 1370 after completing RRC connection with the 5G stand-alone base station 1330, and transmits and receives data through the 5G stand-alone base station 1330 or the 5G non-stand-alone base station 1340. In this case, the duplex type of the 5G stand-alone base station 1330 or the 5G non-stand-alone base station 1340 is not limited, and it is assumed that the 5G stand-alone base station 1330 or the 5G non-stand-alone base station 1340 are connected through an ideal backhaul network or a non-ideal backhaul network. Accordingly, in the case of having the ideal backhaul network 1350, rapid X2 communication between base stations becomes possible. In the system of FIG. 13B, the 5G cell may be provided with a plurality of serving cells.

Next, in case of operating the TDD in the 5G communication system of FIGS. 13A and 13B, a scheme will be described, in which a subframe (it can be mixedly used with a slot) is divided into a plurality of types, and it is prevented to exceed the maximum delay time during signal transmission/reception in consideration of a specific one of respective subframe types as a subframe that can be dynamically changed uplink and downlink.

Figure 14:
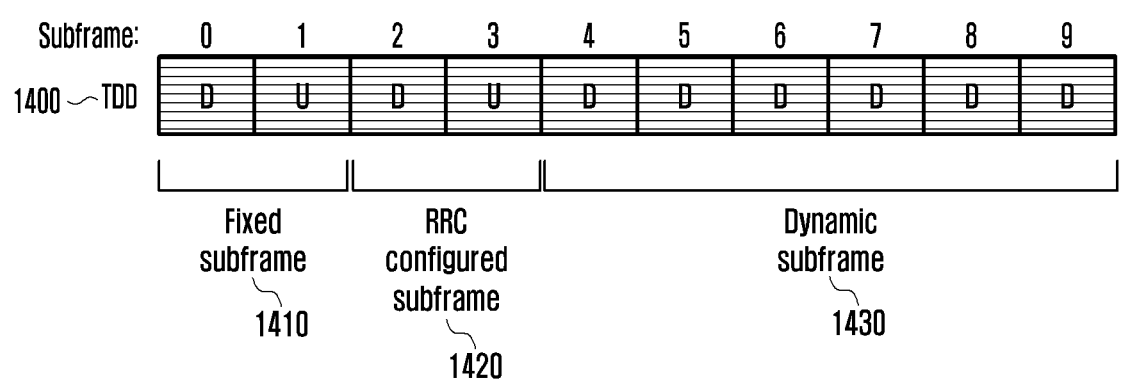
FIG. 14 is a diagram illustrating an example in which 5G for each subframe type is operated in TDD.

First, FIG. 14 is a diagram illustrating a first embodiment in which 5G for each subframe type is operated in TDD. Referring to FIG. 14, in case of operating a 5G communication system in one TDD carrier, the subframe type is divided into a fixed subframe, an RRC subframe, and a dynamic subframe, and the base station and the terminal may transmit and receive data in a manner that they perform synchronization signal and system information transmission and random access in the fixed subframe, perform additional system information transmission and additional random access in the RRC subframe, and dynamically change the subframes to match the uplink/downlink data in the dynamic subframes.

First, the fixed subframe will be described. The fixed subframe may be a subframe determined as uplink or downlink subframe, or a subframe having a part of a resource fixed as uplink or downlink resource in the subframe. Referring to FIG. 14, TDD 1400 information (carrier frequency, frequency band (BW), and their location information) may be transmitted from a 5G base station to a 5G capable terminal, and the 5G capable terminal may obtain the above-described information through synchronization acquisition and essential system information reception in the fixed subframe 1410. As described above, the resource fixed uplink or downlink may be composed of one or more OFDM symbols in the time domain, and may be composed of one or more REs or PRBs in the frequency domain. The location and the number of fixed subframes 1410 are merely exemplary, and locations of other fixed subframes and the number of fixed subframes, or DL fixed subframes and UL fixed subframes may be determined in advance through the standards. Further, they may be included in system information to be transmitted to the terminal.

The 5G capable terminal may attempt to acquire synchronization and essential system information from the DL fixed subframes, acquire random access related information through the received essential system information, and attempt the random access in the UL fixed subframes. Further, the 5G capable terminal may attempt to acquire synchronization and essential system information from the time or frequency resource prescribed in the standards, acquire information on the fixed subframes and random access related information through the received essential system information, and attempt the random access in the UL fixed subframes.

Next, RRC subframe 1420 will be described. It is preferable to determine the minimum number of fixed subframes 1410 in the standards. This is because, if the number of fixed subframes 1410 becomes larger, it is required to take a delay time caused by the fixed subframes into consideration. If UL data transmission for URLLC is performed in the DL fixed subframe, it is required to delay URLLC UL data transmission until an UL subframe appears, and in this case, it is difficult to satisfy ultra-delay time requirements for URLLC. Accordingly, instead of minimizing the number and the locations of fixed subframes 1410, it is possible to make the base station configure the RRC subframe 1420 through higher signal transmission in order to support service specialized system information transmission in accordance with the number of terminals in the cell and a random access command by the base station. The terminal acquires the location and the number of uplink/downlink subframes of the RRC subframe 1420 through the reception of the higher signal, and performs decoding of downlink control information only in the subframe having a downlink resource on which the decoding of the downlink control information should be performed in the RRC subframe 1420 to reduce decoding complexity. The fixed subframe may also be included in the higher signal.

Specifically, if there is no information on the RRC subframe 1420 from the base station, the terminal does not attempt decoding of the downlink control information with respect to the uplink fixed subframe 1410, but attempts to decode the downlink control information only with respect to the downlink fixed subframe 1410. The terminal determines the remaining subframes excluding the fixed subframe 1410 as dynamic subframes 1430 in all, and attempts to decode the downlink control information for each subframe.

If the terminal receives the information on the RRC subframe 1420 transmitted from the base station, it does not attempt decoding of the downlink control information with respect to the uplink fixed subframe 1410, but attempts to decode the downlink control information only with respect to the downlink fixed subframe 1410. Next, the terminal does not attempt decoding of the downlink control information with respect to the uplink RRC subframe 1420, but attempts to decode the downlink control information only with respect to the downlink RRC subframe 1420. The terminal determines the remaining subframes excluding the fixed subframe 1410 and the RRC subframe 1420 as dynamic subframes 1430 in all, and attempts to decode the downlink control information for each subframe.

Next, the dynamic subframe 1430 will be described. The dynamic subframe 1430 may be a downlink subframe or may be an uplink subframe in accordance with the base station scheduling. The terminal determines whether the corresponding dynamic subframe 1430 is uplink or downlink subframe through reception of the downlink control information transmitted by the base station, and performs downlink data reception and uplink data transmission in accordance with the scheduling by the determined subframe and the decoded downlink control information.

If the terminal receives the downlink control information for the corresponding subframe after acquiring information on the fixed subframe or RRC subframe, it may perform the following operation.

First, the terminal disregards reception of the downlink control information, and performs an operation with respect to the fixed subframe or the RRC subframe in accordance with previously acquired information. That is, the terminal operates to maintain the UL/DL structure or format structure for the fixed subframe or the RRC subframe. In this case, it is advantageous that interference does not exert an influence on other terminals in the system.

Second, the terminal performs an operation with respect to the corresponding subframe by updating the previously acquired information through the newly received downlink control information with respect to the fixed subframe or the RRC subframe. That is, the UL/DL structure or the format structure for the fixed subframe or the RRC subframe is changed to the UL/DL structure or the format structure acquired through the downlink control information. In this case, according to the intention of the base station, the terminal can operate through the change of the UL/DL structure of the corresponding subframe.

Third, the terminal performs an operation with respect to the corresponding subframe by updating (i.e., applying) the previously acquired information through the newly received downlink control information with respect to the fixed subframe or the RRC subframe only at the corresponding moment. That is, the UL/DL structure or the format structure for the fixed subframe or the RRC subframe is changed to the UL/DL structure or the format structure acquired through reception of the downlink control information, and thereafter, the UL/DL structure for the fixed subframe or the RRC subframe is changed again to the previously acquired information. In this case, according to the intention of the base station, the terminal can operate through the change of the UL/DL structure of the corresponding subframe in real time, and then can maintain again the previously configured fixed subframe or the RRC subframe configuration.

Next, in case of operating the TDD in the 5G communication system of FIGS. 13A and 13B, a scheme will be described, in which a subframe is divided into a plurality of types, and it is prevented to exceed the maximum delay time during signal transmission/reception in consideration of a specific one of respective subframe types as a subframe that can be dynamically changed uplink and downlink.

Figure 15:
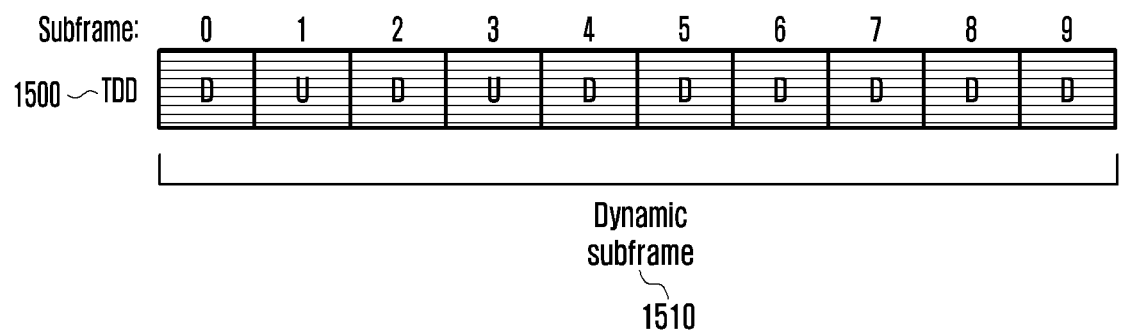
FIG. 15 is a diagram illustrating another example in which 5G for each subframe type is operated in TDD.

FIG. 15 is a diagram illustrating a second embodiment in which a 5G system for each subframe type is operated in TDD. Referring to FIG. 15, in operating the 5G communication system in one TDD carrier, all subframes are operated as dynamic subframes, and the terminal performs synchronization signal and system information transmission and a random access through another 5G stand-alone cell, and dynamically change the subframe to match the UL/DL data in the dynamic subframes to transmit/receive data.

First, a scheme for the terminal to support the synchronization signal and system information reception and the random access will be described.

Referring to FIG. 15, TDD 1500 information (carrier frequency, frequency band (BW), and their location information) may be transmitted from another stand-alone 5G base station connected through carrier aggregation or dual connectivity to a 5G capable terminal, and the 5G capable terminal may obtain the above-described information through synchronization acquisition from the stand-alone 5G base station and essential system information reception.

Since all subframes are operated as dynamic subframe 1510, the dynamic subframe 1510 may be a downlink subframe or may be an uplink subframe in accordance with the base station scheduling. The terminal determines whether the corresponding dynamic subframe 1510 is uplink or downlink subframe through reception of the downlink control information transmitted by the base station, and performs downlink data reception and uplink data transmission in accordance with the scheduling by the determined subframe and the decoded downlink control information.

Figure 16A:
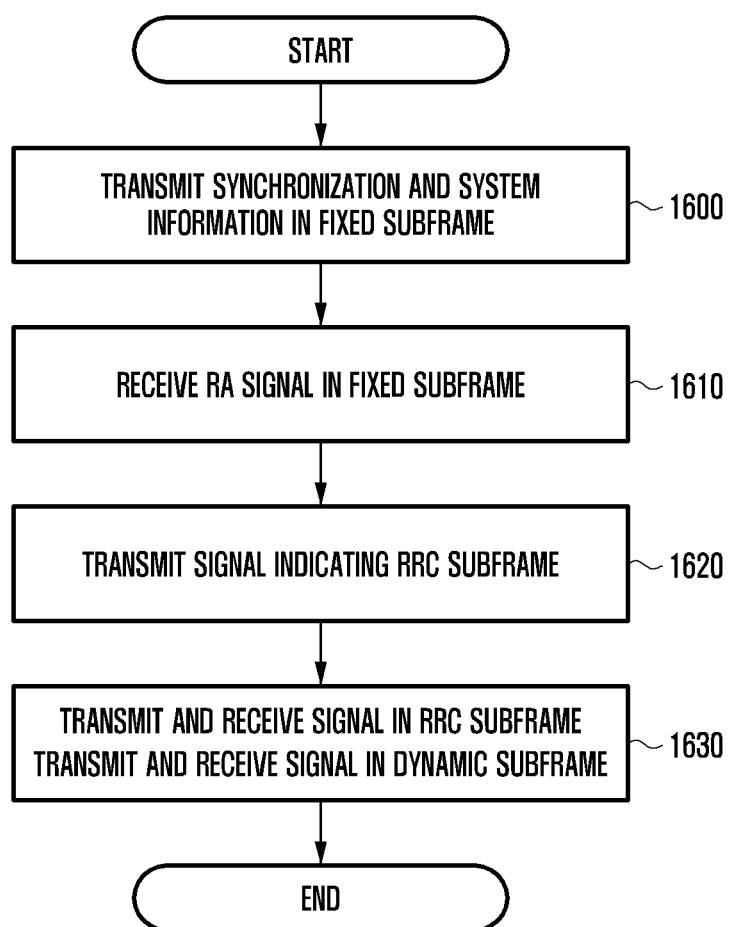
FIGS. 16A and 16B are diagrams illustrating procedures of a base station and a terminal according to an embodiment of the present disclosure operating 5G for each subframe type in TDD.
Figure 16B:
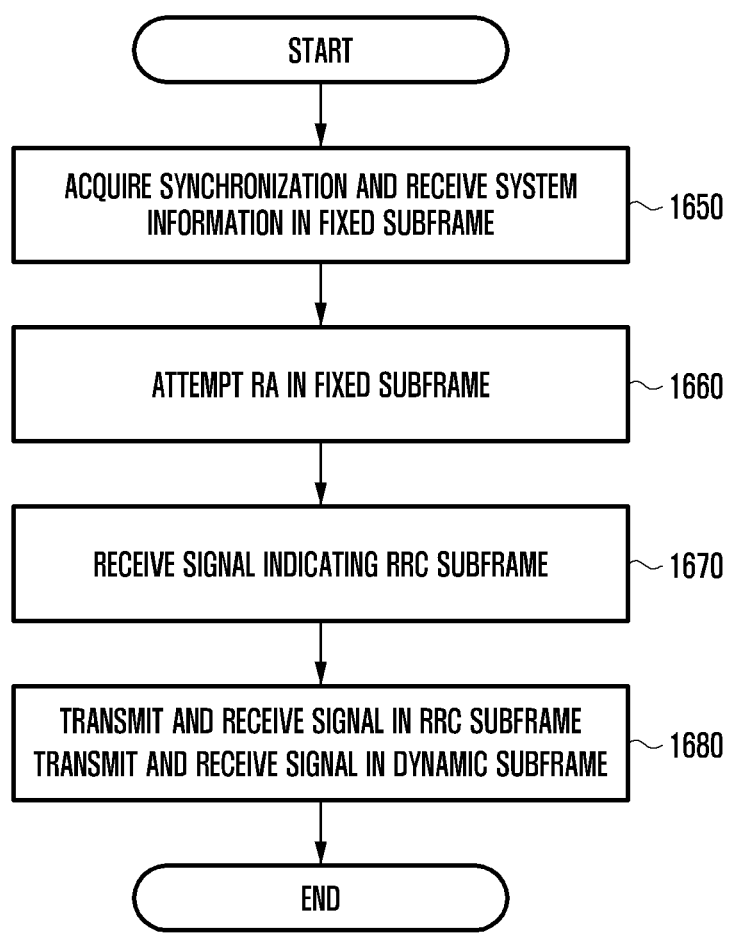

FIGS. 16A and 16B are diagrams illustrating procedures of a base station and a terminal according to an embodiment of the present disclosure operating a 5G communication system for each subframe type in TDD.

Referring to FIG. 16A, a procedure will be described, in which a 5G base station configures a 5G resource for each subframe type in TDD, and transmits and receives data with a 5G terminal on the resource for the 5G.

Referring to FIG. 16A, at operation 1600, the 5G base station transmits synchronization signal and system information to the 5G terminal in a fixed subframe. The synchronization signal for the 5G may be a separate synchronization signal for eMBB, mMTC, and URLLC using different numerologies, or a common synchronization signal on a specific 5G resource using one numerology. The system information may include 5G frequency information (e.g., carrier frequency and physical resource block related information), time information (e.g., radio frame index, slot related information, MBSFN subframe information for 5G transmission, and information for random access), antenna information, spatial information, duplex information (FDD DL and/or UL carrier information, TDD UL/DL configuration information, and LAA operation related information), a reference signal, or a synchronization signal. The system information may be transmitted as a common system signal on a specific 5G resource using one numerology, and may be transmitted as separate system information for eMBB, mMTC, and URLLC using different numerologies.

At operation 1610, the 5G base station receives a random access signal from the 5G terminal in the fixed subframe, and thereafter, performs a random access process with the 5G terminal.

At operation 1620, the 5G base station transmits a signal indicating an RRC subframe to the 5G terminal. The operation 1620 may be performed in case where the 5G base station determines that the operation 1620 is necessary. If the signal is not transmitted, the subframe type includes only the fixed subframe and a dynamic subframe.

At operation 1630, the 5G base station transmits and receives a signal with the 5G terminal in the RRC subframe and the dynamic subframe. The information being transmitted and received and the base station procedure are as described above with reference to FIGS. 14 and 15.

Referring to FIG. 16B, a procedure will be described, in which a 5G terminal receives a 5G resource configured by a 5G base station for each subframe type in TDD, and transmits and receives data with the 5G base station on the resource for the 5G.

At operation 1650, the 5G terminal receives synchronization signal and system information from the 5G base station in a fixed subframe. The synchronization signal for the 5G may be a separate synchronization signal for eMBB, mMTC, and URLLC using different numerologies, or a common synchronization signal on a specific 5G resource using one numerology. The system information may include 5G frequency information (e.g., carrier frequency and physical resource block related information), time information (e.g., radio frame index, slot related information, MBSFN subframe information for 5G transmission, and information for random access), antenna information, spatial information, duplex information (FDD DL and/or UL carrier information, TDD UL/DL configuration information, and LAA operation related information), a reference signal, or a synchronization signal. The system information may be received as a common system signal on a specific 5G resource using one numerology, and may be received as separate system information for eMBB, mMTC, and URLLC using different numerologies.

At operation 1660, the 5G terminal attempts a random access (i.e., transmits a random access signal) in the fixed subframe, and thereafter, performs a random access process with the 5G base station.

At operation 1670, the 5G terminal receives a signal indicating an RRC subframe from the 5G base station. If the 5G terminal cannot receive the signal at operation 1670, it determines that the subframe type includes only the fixed subframe and the dynamic subframe.

At operation 1680, the 5G terminal transmits and receives a signal with the 5G base station in the RRC subframe and the dynamic subframe. The information being transmitted and received and the terminal procedure are as described above with reference to FIGS. 14 and 15.

Figure 17:
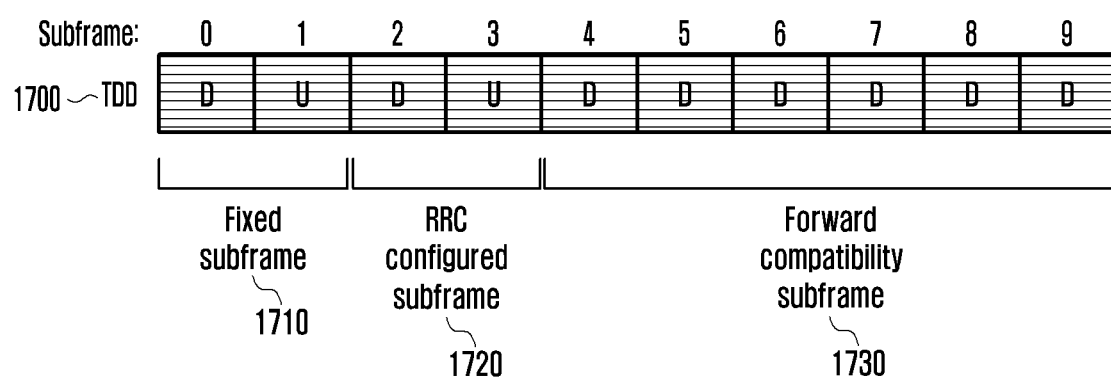
FIG. 17 is a diagram illustrating an example for providing forward compatibility for each subframe type in TDD.

Next, FIG. 17 is a diagram illustrating a first embodiment for providing forward compatibility for each subframe type in TDD. In case of providing forward 5G phase 2 or beyond 5G technology and services through FIG. 17, a scheme for causing no forward compatibility problem in the 5G service and technical support is provided.

Referring to FIG. 17, in case of operating a 5G communication system in one TDD carrier, the subframe type is divided into a fixed subframe, an RRC subframe, and a forward compatibility subframe, and the base station and the terminal may perform synchronization signal and system information transmission and random access in the fixed subframe, perform additional system information transmission and additional random access in the RRC subframe, and transmit and receive data for 5G data or 5G phase 2 and beyond 5G technology and services in the forward compatibility subframes. Accordingly, regardless of what purpose the forward compatibility subframes are used for, the essential and additional system operations are performed through the fixed subframe or the RRC subframe, and thus it can be known that there is not any backward compatibility problem in the 5G service and technical support.

First, the fixed subframe will be described. Referring to FIG. 17, TDD 1700 information (carrier frequency, frequency band, and their location information) may be transmitted from a 5G base station to a 5G capable terminal, and the 5G capable terminal may obtain the above-described information through synchronization acquisition and essential system information reception in the fixed subframe 1710. In FIG. 17, the location and the number of fixed subframes 1710 are merely exemplary. The location and the number of different fixed subframes, downlink fixed subframes, and uplink fixed subframes may be determined in advance through the standards. The 5G capable terminal attempts to acquire synchronization and essential system information from the downlink fixed subframes, acquires random access related information through the received essential system information, and attempts the random access in the uplink fixed subframes.

Next, the RRC subframe 1720 will be described. It is preferable to determine the minimum number of fixed subframes 1710 in the standards. This is because, if the number of fixed subframes 1710 becomes larger, it is required to take a delay time caused by the fixed subframes into consideration, and the number of subframes that can be used for the forward compatibility is reduced. If uplink data transmission for URLLC is performed in the downlink fixed subframe, it is required to delay URLLC uplink data transmission until the uplink subframe appears, and in this case, it is difficult to satisfy ultra-delay time requirements for the URLLC. Accordingly, instead of minimizing the number and the locations of fixed subframes 1710, it is possible to make the base station configure the RRC subframe 1720 through higher signal transmission in order to support service specialized system information transmission in accordance with the number of terminals in the cell and a random access command by the base station. The terminal acquires the location and the number of uplink/downlink subframes of the RRC subframe 1720 through the reception of the higher signal, and performs decoding of downlink control information only in the subframe having a downlink resource on which the decoding of the downlink control information should be performed in the RRC subframe 1720 to reduce decoding complexity.

Specifically, if there is no information on the RRC subframe 1720 from the base station, the terminal does not attempt decoding of the downlink control information with respect to the uplink fixed subframe 1710, but attempts to decode the downlink control information with respect to the downlink fixed subframe 1720. The terminal determines the remaining subframes excluding the fixed subframes 1710 as forward compatibility subframes 1730 in all, and attempts to decode the downlink control information for each subframe. If the terminal does not receive any downlink control information (or if the terminal receives information indicating that the previous or post subframe or slot is for the forward compatibility) in the forward compatibility subframe, the terminal does not perform any operation in the forward compatibility subframe, and is shifted to an idle state to lower power consumption.

If the information on the RRC subframe 1720 is transmitted from the base station and is received in the terminal, the terminal does not attempt decoding of the downlink control information with respect to the uplink fixed subframe 1710, but attempts to decode the downlink control information with respect to the downlink fixed subframe 1710. Next, the terminal does not attempt decoding of the downlink control information with respect to the uplink RRC subframe 1720, but attempts to decode the downlink control information with respect to the downlink RRC subframe 1720. The terminal determines the remaining subframes excluding the fixed subframes 1710 and the RRC subframe 1720 as forward compatibility subframes 1730 in all, and attempts to decode the downlink control information for each subframe. If the terminal does not receive any downlink control information (or if the terminal receives information indicating that the previous or post subframe or slot is for the forward compatibility) in the forward compatibility subframe, the terminal does not perform any operation in the forward compatibility subframe, and is shifted to an idle state to lower power consumption. Actually, the terminal may not know the existence of the forward compatibility subframe, and it is also possible for the terminal to determine that the terminal does not receive any downlink control information in the forward compatibility subframe.

Next, the forward compatibility subframe 1730 will be described. The forward compatibility subframe 1730 may be a downlink subframe or may be an uplink subframe in accordance with the base station scheduling. The terminal determines whether the corresponding dynamic subframe 1730 is uplink or downlink through reception of the downlink control information transmitted by the base station, and performs downlink data reception and uplink data transmission in accordance with the scheduling by the determined subframe and the decoded downlink control information. If the terminal does not receive any downlink control information (or if the terminal receives information indicating that the previous or post subframe or slot is for the forward compatibility) in the forward compatibility subframe, the terminal does not perform any operation in the forward compatibility subframe, and is shifted to an idle state to lower power consumption. Actually, the terminal may not know the existence of the forward compatibility subframe, and it is also possible for the terminal to determine that the terminal does not receive any downlink control information in the forward compatibility subframe.

Figure 18:
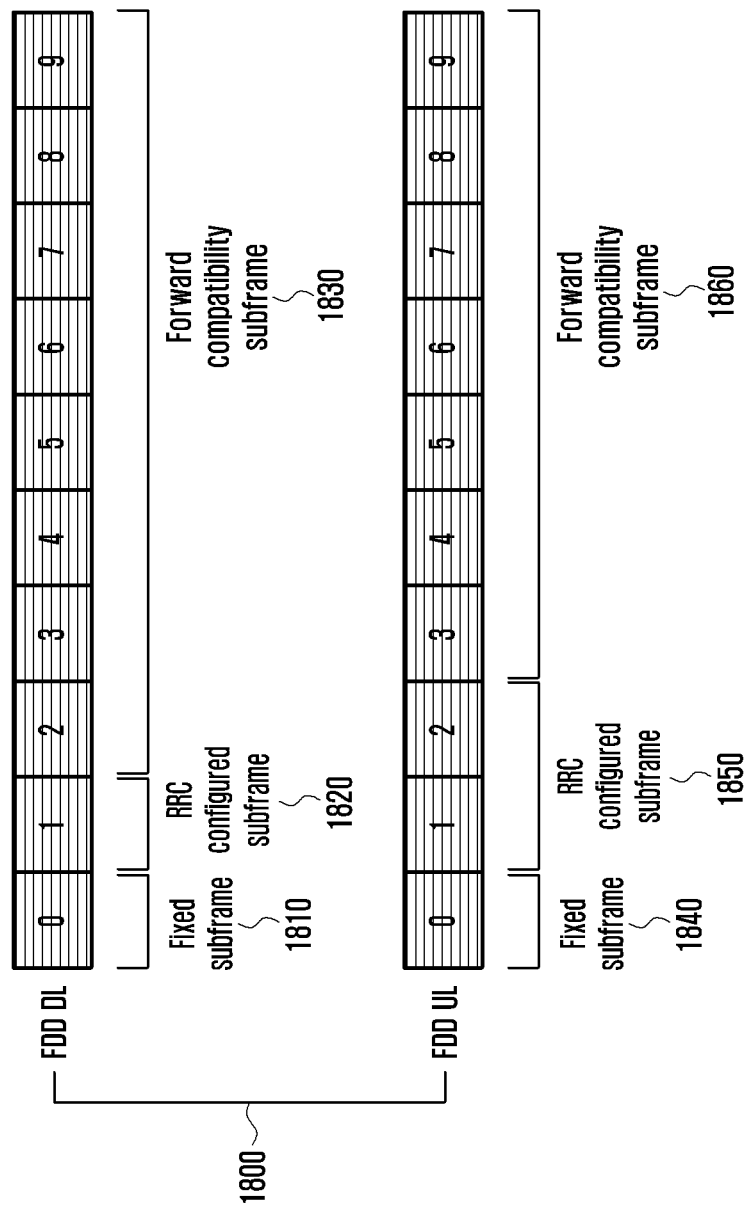
FIG. 18 is a diagram illustrating another example for providing forward compatibility for each subframe type in FDD.

FIG. 18 is a diagram illustrating a second embodiment for providing forward compatibility for each subframe type in FDD. In case of providing forward 5G phase 2 or beyond 5G technology and services through FIG. 18, a scheme for causing no forward compatibility problem in the 5G service and technical support is provided.

Referring to FIG. 18, in case of operating a 5G communication system in one TDD carrier, the subframe type is divided into a fixed subframe, an RRC subframe, and a forward compatibility subframe for each downlink carrier and uplink carrier, and the base station and the terminal may perform synchronization signal and system information transmission and random access in the fixed subframe of the downlink carrier, perform additional system information transmission and additional random access in the RRC subframe, and transmit and receive data for 5G data transmission/reception or 5G phase 2 and beyond 5G technology and services in the forward compatibility subframes. Further, the terminal may perform contention-based (hereinafter, mixedly used with competition-based) random access using the fixed subcarrier of the uplink carrier, perform additional random access triggered by the base station (i.e., non-contention based random access can be performed using the RRC subframe that can be configured to the terminal, and it does not exclude contention-based random access using the RRC subframe) using the RRC subframe, and transmit and receive data for 5G data transmission/reception or 5G phase 2 and beyond 5G technology and services using the forward compatibility subframe. Accordingly, regardless of what purpose the forward compatibility subframes are used for, the essential and additional system operations are performed through the fixed subframe or the RRC subframe, and thus it can be known that there is not any backward compatibility problem in the 5G service and technical support.

First, the fixed subframe 1810 of the downlink carrier and the fixed subframe 1840 of the uplink carrier will be described. Referring to FIG. 18, FDD 1800 information (downlink and uplink carrier frequency, frequency band (BW), and their location information) may be transmitted from a 5G base station to a 5G capable terminal, and the 5G capable terminal may obtain the above-described information through synchronization acquisition and essential system information reception in the fixed subframe 1810 of the downlink carrier. The location and the number of fixed subframes 1810 of the downlink carrier are merely exemplary. The location and the number of different fixed subframes may be determined in advance through the standards. The 5G capable terminal attempts to acquire synchronization and essential system information from the fixed subframes, and acquires random access related information through the received essential system information. The terminal attempts the random access in the fixed subframes 1840 of the uplink carrier. The location and the number of fixed subframes 1840 of the uplink carrier are merely exemplary. The location and the number of different fixed subframes may be determined in advance through the standards.

Next, the RRC subframe 1820 of the downlink carrier and the RRC subframe 1850 of the uplink carrier will be described. It is preferable to determine the minimum number of fixed subframes 1810 and 1840 in the standards. This is because, if the number of fixed subframes 1810 and 1840 becomes larger, it is required to take a delay time caused by the fixed subframes into consideration, and the number of subframes that can be used for the forward compatibility is reduced. Accordingly, instead of minimizing the number and the locations of fixed subframes 1810 and 1840, it is possible to make the base station configure the RRC subframes 1820 and 1850 through higher signal transmission in order to support service specialized system information transmission in accordance with the number of terminals in the cell and a random access command by the base station. The terminal acquires the location and the number of RRC subframes 1820 and 1850 of the downlink carrier and the uplink carrier through reception of the higher signal.

If there is no information on the RRC subframes 1820 and 1850 from the base station, the terminal determines the remaining subframes excluding the fixed subframes 1810 and 1840 as forward compatibility subframes 1830 and 1860 in all, and attempts to decode all the downlink control information for each subframe 1830. If the terminal does not receive any downlink control information (or if the terminal receives information indicating that the previous or post subframe or slot is for the forward compatibility) in the forward compatibility subframe, the terminal does not perform any operation in the forward compatibility subframe, and is shifted to an idle state to lower power consumption.

If the information on the RRC subframes 1820 and 1840 is transmitted from the base station and is received in the terminal, the terminal determines the remaining subframes excluding the fixed subframes 1810 and 1840 and the RRC subframes 1820 and 1840 as forward compatibility subframes 1830 and 1860 in all, and attempts to decode the downlink control information for each subframe 1830. If the terminal does not receive any downlink control information (or if the terminal receives information indicating that the previous or post subframe or slot is for the forward compatibility) in the forward compatibility subframe, the terminal does not perform any operation in the forward compatibility subframe, and is shifted to an idle state to lower power consumption. Actually, the terminal may not know the existence of the forward compatibility subframe, and it is also possible for the terminal to determine that the terminal does not receive any downlink control information in the forward compatibility subframe.

Next, the forward compatibility subframes 1830 and 1860 will be described. If the terminal does not receive any downlink control information (or if the terminal receives information indicating that the previous or post subframe or slot is for the forward compatibility) in accordance with the base station scheduling in the forward compatibility subframe 1830, the terminal does not perform any operation in the forward compatibility subframes 1830 and 1860, and is shifted to an idle state to lower power consumption. Actually, the terminal may not know the existence of the forward compatibility subframe, and it is also possible for the terminal to determine that the terminal does not receive any downlink control information in the forward compatibility subframe.

Figure 19A:
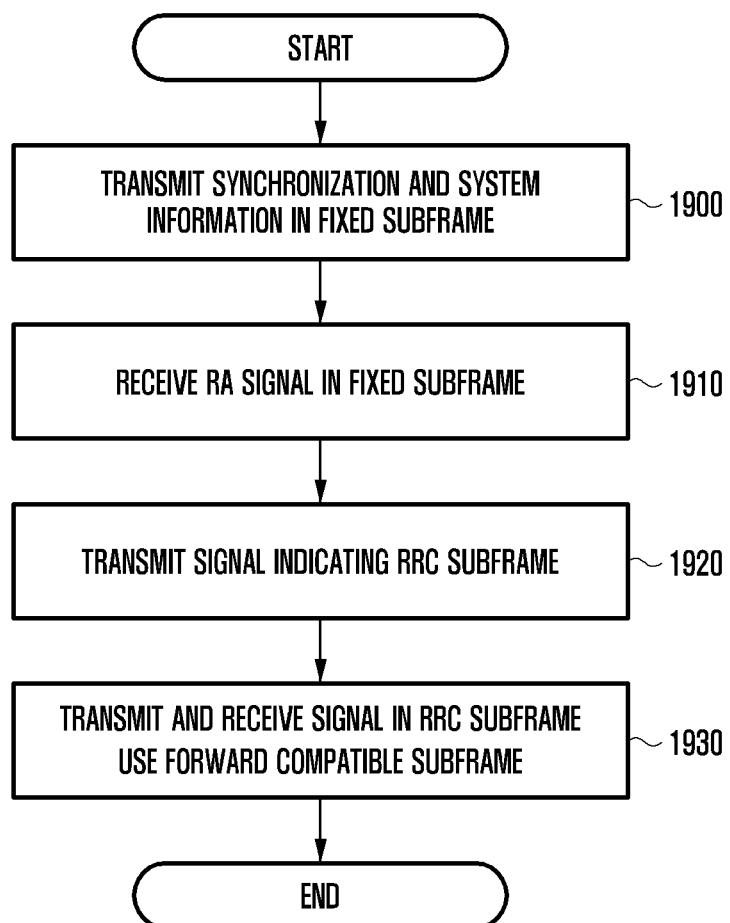
FIGS. 19A and 19B are diagrams illustrating procedures of a base station and a terminal according to an embodiment of the present disclosure for providing forward compatibility for each subframe type.
Figure 19B:
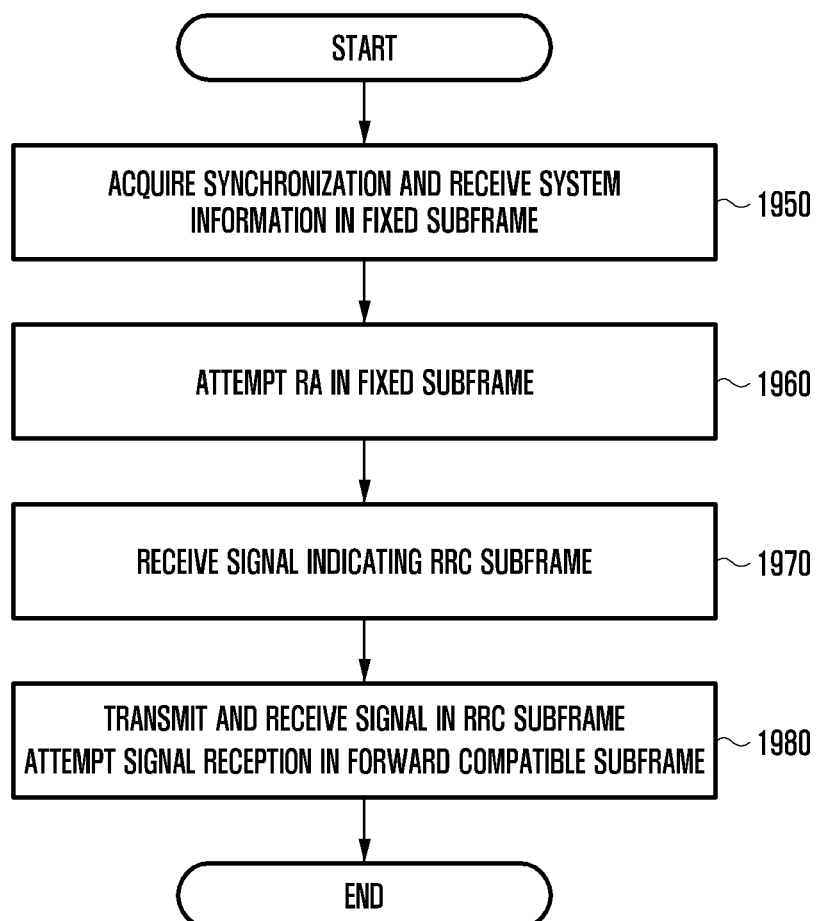

Next, FIGS. 19A and 19B are diagrams illustrating procedures of a base station and a terminal according to an embodiment of the present disclosure for providing forward compatibility for each subframe type. Referring to FIGS. 19A and 19B, a method, in which a 5G base station configures resources for a 5G resource and forward compatibility for each subframe type, and a procedure, in which a 5G terminal transmits and receives data on the resource for the 5G, will be described.

Referring to FIG. 19A, at operation 1900, the 5G base station transmits synchronization signal and system information to the 5G terminal in a fixed subframe. The synchronization signal for the 5G may be a separate synchronization signal for eMBB, mMTC, and URLLC using different numerologies, or a common synchronization signal on a specific 5G resource using one numerology. The system information may include 5G frequency information (e.g., carrier frequency and physical resource block related information), time information (e.g., radio frame index, slot related information, MBSFN subframe information for 5G transmission, and information for random access), antenna information, spatial information, duplex information (FDD DL and/or UL carrier information, TDD UL/DL configuration information, and LAA operation related information), a reference signal, or a synchronization signal. The system information may be transmitted as a common system signal on a specific 5G resource using one numerology, and may be transmitted as separate system information for eMBB, mMTC, and URLLC using different numerologies.

At operation 1910, the 5G base station receives a random access signal from the 5G terminal in the fixed subframe, and thereafter, performs a random access process with the 5G terminal.

At operation 1920, the 5G base station transmits a signal indicating an RRC subframe to the 5G terminal. The operation 1920 may be performed in case where the 5G base station determines that the operation 1620 is necessary. If the signal is not transmitted, the subframe type includes only the fixed subframe and a dynamic subframe.

At operation 1930, the 5G base station transmits and receives a signal with the 5G terminal in the RRC subframe and the forward compatibility subframe. The information being transmitted and received and the base station procedure are as described above with reference to FIGS. 17 and 18.

Referring to FIG. 19B, a procedure will be described, in which a 5G terminal receives a 5G resource configured by a 5G base station for each subframe type and a resource for forward compatibility, and transmits and receives data with the 5G base station on the resource for the 5G.

At operation 1950, the 5G terminal receives synchronization signal and system information from the 5G base station in a fixed subframe. The synchronization signal for the 5G may be a separate synchronization signal for eMBB, mMTC, and URLLC using different numerologies, or a common synchronization signal on a specific 5G resource using one numerology. The system information may include 5G frequency information (e.g., carrier frequency and physical resource block related information), time information (e.g., radio frame index, slot related information, MBSFN subframe information for 5G transmission, and information for random access), antenna information, spatial information, duplex information (FDD DL and UL carrier information, TDD UL/DL configuration information, and LAA operation related information), a reference signal, or a synchronization signal. The system information may be received as a common system signal on a specific 5G resource using one numerology, and may be received as separate system information for eMBB, mMTC, and URLLC using different numerologies.

At operation 1960, the 5G terminal attempts a random access (i.e., transmits a random access signal) in the fixed subframe, and thereafter, performs a random access process with the 5G base station.

At operation 1970, the 5G terminal receives a signal indicating an RRC subframe from the 5G base station. If the 5G terminal cannot receive the signal at operation 1970, it determines that the subframe type includes only the fixed subframe and the forward compatibility subframe.

At operation 1980, the 5G terminal transmits and receives the signal with the 5G base station in the RRC subframe and the forward compatibility subframe. The information being transmitted and received and the terminal procedure are as described above with reference to FIGS. 17 and 18.

Figure 20:
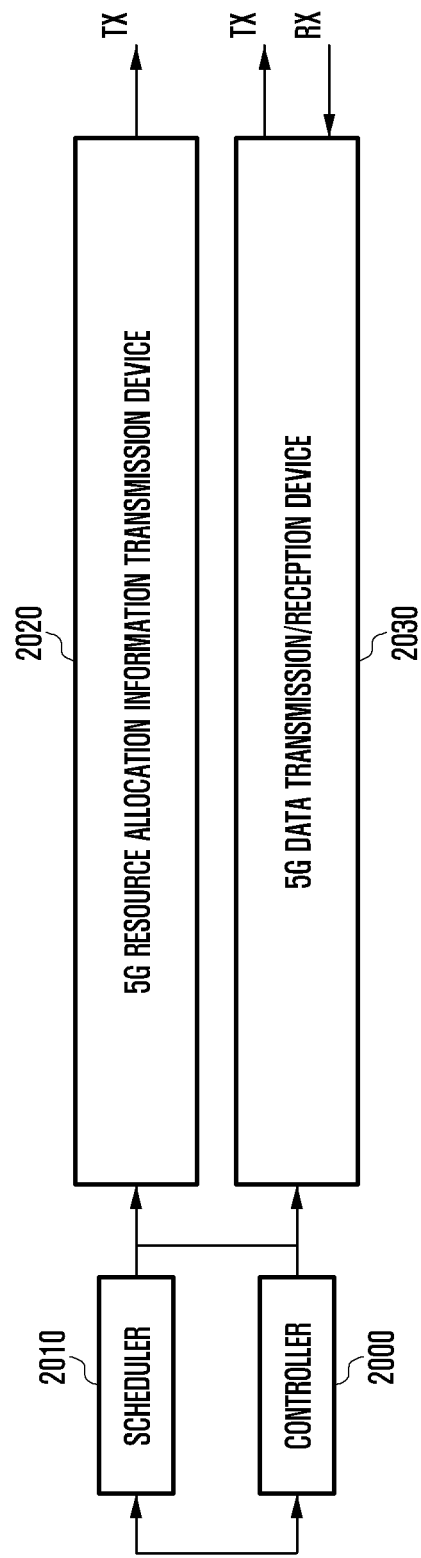
FIG. 20 is a diagram illustrating the configuration of a base station device according to the present disclosure.

Next, FIG. 20 is a diagram illustrating the configuration of a base station device according to the present disclosure.

Referring to FIG. 20, the base station device is composed of a controller 2000, a scheduler 2010, a 5G resource allocation information transmission device 2020, and a 5G data transmission/reception device 2030, and this may be understood as a configuration of the controller 2000 including the scheduler 2010, and a transceiver including the 5G resource allocation information transmission device 2020, and the 5G data transmission/reception device 2030. In accordance with a base station procedure according to FIGS. 16A and 19A, a TDD operation scheme for each subframe type according to FIGS. 14, 15, 17, and 18 according to the present disclosure, and a forward compatibility subframe operation scheme for each subframe type, the controller 2000 controls 5G resource allocation, transmits resource allocation information to the terminal through the 5G resource allocation information transmission device 2020, and transmits and receives 5G data with the 5G terminal through the 5G data transmission/reception device 2030 through scheduling of the 5G data on the 5G resource by means of the scheduler 2010.

Figure 21:
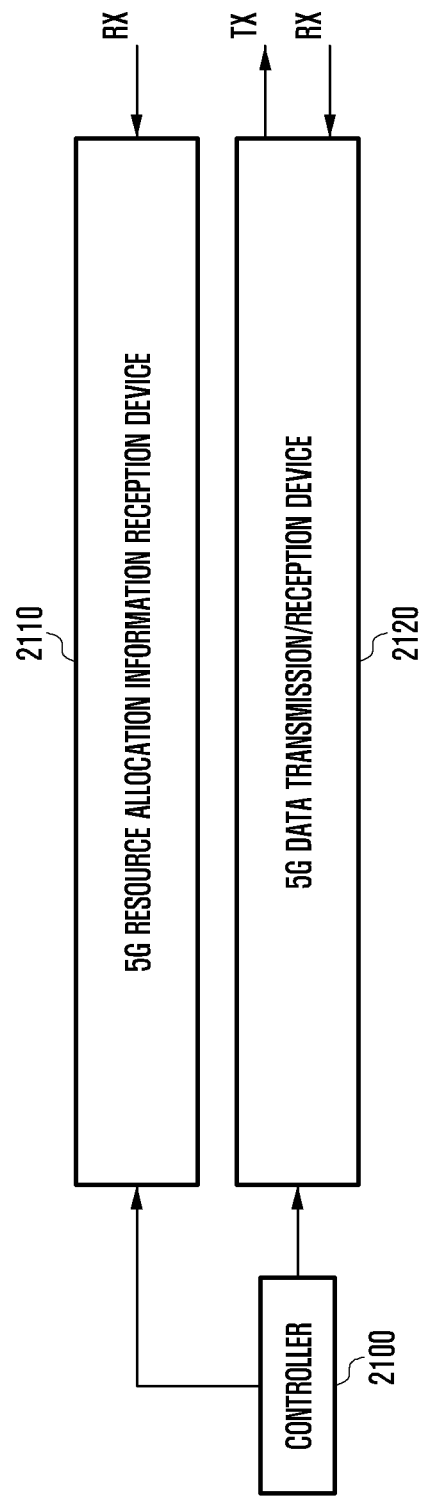
FIG. 21 is a diagram illustrating the configuration of a terminal device according to the present disclosure.

Next, FIG. 21 is a diagram illustrating the configuration of a terminal device according to the present disclosure.

Referring to FIG. 21, the terminal device is composed of a controller 2100, a 5G resource allocation information reception device 2110, and a 5G data transmission/reception device 2120, and this may be understood as a configuration of the controller 2100, and a transceiver including the 5G resource allocation information reception device 2110 and the 5G data transmission/reception device 2120. In accordance with a terminal procedure according to FIGS. 16B and 19B, a TDD operation scheme for each subframe type according to FIGS. 14, 15, 17, and 18 according to the present disclosure, and a forward compatibility subframe operation scheme for each subframe type, the terminal device receives 5G resource allocation information from the base station through the 5G resource allocation information reception device 2110, and the controller 2100 transmits and receives data with the 5G base station through control of the 5G data transmission/reception device 2120 with respect to the scheduled 5G data on the allocated 5G resource.

On the other hand, embodiments of the present disclosure have been presented to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein. Further, the respective embodiments may be combined with each other to be operated. For example, portions of the embodiments of the present disclosure may be combined with each other to be operated by the base station and the terminal.

What is claimed is:

1. A method performed by a terminal in a wireless communication system, the method comprising:
   identifying a subcarrier spacing (SCS) of a synchronization signal being associated with a frequency band;
   identifying the synchronization signal based on the identified subcarrier spacing;
   obtaining a master information block (MIB) received from a base station using the identified SCS;
   receiving a system information block 1 (SIB1) based on the obtained MIB; and
   obtaining information on a SCS for downlink signals except for the MIB and the SIB1,
   wherein the MIB includes information on a SCS of the SIB1.

2. The method of claim 1, further comprising:
   identifying a reference timing and a frequency offset based on the identified SCS and the synchronization signal.

3. The method of claim 1, further comprising:
   changing a terminal hardware configuration to attempt to detect the synchronization signal using the identified SCS.

4. The method of claim 1, wherein the information on the SCS of the SIB1 is bit information.

5. The method of claim 1, wherein the SIB1 includes information on a SCS corresponding to other SIB than the SIB1.

6. A method performed by a base station in a wireless communication system, the method comprising:
   identifying a subcarrier spacing (SCS) of a synchronization signal being associated with a frequency band;
   transmitting the synchronization signal using the identified SCS;
   transmitting a master information block (MIB) using the identified SCS;
   transmitting a system information block 1 (SIB1) according to the MIB; and
   identifying information on a SCS for downlink signals except for the MIB and the SIB1,
   wherein the MIB includes information on a SCS of the SIB1.

7. The method of claim 6, wherein the identified SCS is 15 khz or 30 khz in a case that the frequency band is from 2 Ghz to 4 Ghz.

8. The method of claim 6, wherein a SCS for higher frequency band is larger than a subcarrier spacing for lower frequency band.

9. The method of claim 6, wherein the information on the SCS of the SIB1 is bit information.

10. The method of claim 6, wherein the SIB1 includes information on a SCS corresponding to other SIB than the SIB1.

11. A terminal in a wireless communication system, the terminal comprising:
    a transceiver; and
    a controller coupled with the transceiver and configured to:
      identify a subcarrier spacing (SCS) of a synchronization signal being associated with a frequency band,
      identify the synchronization signal based on the identified subcarrier spacing,
      obtain a master information block (MIB) received from a base station using the identified the SCS,
      receive a system information block 1 (SIB1) based on the obtained MIB, and
      obtain information on a SCS for downlink signals except for the MIB and the SIB1,
    wherein the MIB includes information on a SCS of the SIB1.

12. The terminal of claim 11, wherein the controller is further configured to identify a reference timing and a frequency offset based on the identified SCS and the synchronization signal.

13. The terminal of claim 11, wherein the controller is further configured to change a terminal hardware configuration to attempt to detect the synchronization signal using the identified SCS.

14. The terminal of claim 11, wherein the information on the SCS of the SIB1 is bit information.

15. The terminal of claim 11, wherein the SIB1 includes information on a SCS corresponding to other SIB than the SIB1.

16. A base station in a wireless communication system, the base station comprising:
    a transceiver; and
    a controller coupled with the transceiver and configured to:
      identify a subcarrier spacing (SCS) of a synchronization signal being associated with a frequency band,
      transmit the synchronization signal using the identified SCS,
      transmit a master information block (MIB) using the identified SCS,
      transmit a system information block 1 (SIB1) according to the MIB, and
      identify information on a SCS for downlink signals except for the MIB and the SIB1,
    wherein the MIB includes information on a SCS of the SIB1.

17. The base station of claim 16, wherein the identified SCS is 15 khz or 30 khz in a case that the frequency band is from 2 Ghz to 4 Ghz.

18. The base station of claim 16, wherein a SCS for higher frequency band is larger than a subcarrier spacing for lower frequency band.

19. The base station of claim 16, wherein the information on the SCS of the SIB1 is bit information.

20. The base station of claim 16, wherein the SIB1 includes information on a SCS corresponding to other SIB than the SIB1.

* * * * *